United States Patent
Okuma

(10) Patent No.: US 11,484,968 B2
(45) Date of Patent: Nov. 1, 2022

(54) LASER LIGHT IRRADIATION DEVICE AND LASER LIGHT IRRADIATION METHOD

(71) Applicant: HAMAMATSU PHOTONICS K.K., Hamamatsu (JP)

(72) Inventor: Junji Okuma, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 275 days.

(21) Appl. No.: 16/078,220

(22) PCT Filed: Jan. 24, 2017

(86) PCT No.: PCT/JP2017/002351
§ 371 (c)(1),
(2) Date: Aug. 21, 2018

(87) PCT Pub. No.: WO2017/145610
PCT Pub. Date: Aug. 31, 2017

(65) Prior Publication Data
US 2019/0047084 A1  Feb. 14, 2019

(30) Foreign Application Priority Data

Feb. 24, 2016  (JP) .............................. JP2016-033422

(51) Int. Cl.
*B23K 26/06*  (2014.01)
*B23K 26/53*  (2014.01)
(Continued)

(52) U.S. Cl.
CPC .......... *B23K 26/0648* (2013.01); *B23K 26/00* (2013.01); *B23K 26/064* (2015.10); *B23K 26/53* (2015.10)

(58) Field of Classification Search
CPC .. B23K 26/0648; B23K 26/064; B23K 26/53; B23K 26/00; B23K 26/70; B23K 26/03; (Continued)

(56) References Cited

U.S. PATENT DOCUMENTS 5,748,222 A * 5/1998 Roberts ................. B23K 26/06
347/239
2002/0190040 A1  12/2002 Thompson, Jr. et al.
(Continued)

FOREIGN PATENT DOCUMENTS

CN  101678504 A  3/2010
CN  102227286 A  10/2011
(Continued)

OTHER PUBLICATIONS

International Preliminary Report on Patentability dated Sep. 7, 2018 for PCT/JP2017/002351.

*Primary Examiner* — Tu B Hoang
*Assistant Examiner* — Yeong Juen Thong
(74) *Attorney, Agent, or Firm* — Faegre Drinker Biddle & Reath LLP

(57) ABSTRACT

A laser light irradiation device includes: a laser light source; a spatial light modulator including a display unit, the spatial light modulator modulating the laser light in accordance with a phase pattern displayed on the display unit; a beam diameter conversion mechanism arranged on an optical path of the laser light between the laser light source and the spatial light modulator, the beam diameter conversion mechanism enlarging or reducing the beam diameter of the laser light; a lens insertion and removal mechanism including a lens configured to vary the beam diameter of the laser light, the lens insertion and removal mechanism being enabled to insert/remove the lens in/from the optical path; and a controller configured to control the phase pattern to be displayed. The controller displays the phase pattern configured to correct a wavefront aberration caused by insertion or removal of the lens.

5 Claims, 20 Drawing Sheets

(51) Int. Cl.
*B23K 26/00* (2014.01)
*B23K 26/064* (2014.01)

(58) Field of Classification Search
CPC .. B23K 26/082; B23K 26/08; B23K 26/0665; B23K 2203/56; B23K 26/0643; B23K 26/0676; B23K 26/24; B23K 26/02; C03B 33/0222; G02B 5/3016; G02B 7/04; G02B 15/04; G02F 1/133528
USPC ............ 219/121.75, 121.73, 121.72, 121.64, 219/121.67, 121.6; 359/290, 53.24, 116; 438/460, 462, 463, 458, 113, 68, 33, 795; 257/E21.599, E21.349; 250/492.2, 492.1
See application file for complete search history.

(56) References Cited

U.S. PATENT DOCUMENTS

| | | | | |
|---|---|---|---|---|
| 2005/0272223 | A1* | 12/2005 | Fujii | H01L 21/304 438/459 |
| 2011/0075274 | A1* | 3/2011 | Spoerl | G02B 7/08 359/814 |
| 2012/0103955 | A1* | 5/2012 | Hyun | G02F 1/1309 219/121.83 |
| 2012/0327501 | A1* | 12/2012 | Sakamoto | B23K 26/53 359/290 |
| 2013/0050790 | A1* | 2/2013 | Sung | G03H 1/0476 359/22 |

FOREIGN PATENT DOCUMENTS

| | | |
|---|---|---|
| CN | 103170734 A | 6/2013 |
| CN | 104620163 A | 5/2015 |
| CN | 204430558 U | 7/2015 |
| JP | 3878758 B2 | 2/2007 |
| JP | 2011-051011 A | 3/2011 |
| JP | 2012-250249 A | 12/2012 |
| JP | 2013-132651 A | 7/2013 |
| TW | 201100189 A | 1/2011 |
| TW | 201410370 A | 3/2014 |
| WO | WO-2014/041660 A1 | 3/2014 |

\* cited by examiner

LASER LIGHT IRRADIATION DEVICE AND LASER LIGHT IRRADIATION METHOD

TECHNICAL FIELD

One aspect of the present invention relates to a laser light irradiation device and a laser light irradiation method.

BACKGROUND ART

Conventionally, as a laser light irradiation device configured to emit laser light to an object, a device described in Patent Literature 1 is described, for example. In such a laser light irradiation device, a beam diameter of laser light generated by a laser light source is enlarged by a beam expander (beam diameter conversion mechanism), and then the laser light is modulated by a spatial light modulator and emitted to the object.

CITATION LIST

Patent Literature

Patent Literature 1: Japanese Unexamined Patent Publication No. 2011-51011

SUMMARY OF INVENTION

Technical Problem

In the laser light irradiation device, for example, depending on specifications of the object and irradiation conditions, it is required to vary the beam diameter enlarged or reduced by the beam diameter conversion mechanism. In addition, in the laser light irradiation device, simplification of the optical system is required, and it is desired that the request can be simply implemented.

In view of the above, an object of one aspect of the present invention is to provide a laser light irradiation device and a laser light irradiation method enabled to simply vary the beam diameter enlarged or reduced by the beam diameter conversion mechanism.

Solution to Problem

A laser light irradiation device according to one aspect of the present invention is a laser light irradiation device configured to emit laser light to an object, and includes: a laser light source configured to generate the laser light; a spatial light modulator including a display unit configured to display a phase pattern, the spatial light modulator modulating the laser light generated by the laser light source in accordance with the phase pattern displayed on the display unit; a beam diameter conversion mechanism arranged on an optical path of the laser light between the laser light source and the spatial light modulator, the beam diameter conversion mechanism enlarging or reducing the beam diameter of the laser light; a lens insertion and removal mechanism including a lens configured to vary the beam diameter of the laser light, the lens insertion and removal mechanism being enabled to insert the lens in the optical path of the laser light between the laser light source and the spatial light modulator, the lens insertion and removal mechanism being enabled to remove the lens from the optical path; and a controller configured to control at least the phase pattern to be displayed on the display unit, in which the controller displays, on the display unit, the phase pattern configured to correct a wavefront aberration caused by insertion or removal of the lens by the lens insertion and removal mechanism.

In the laser light irradiation device, the lens can be inserted in the optical path of the laser light, and the lens can be removed from the optical path. Thus, the beam diameter of the laser light is varied without requiring a complicated mechanism configured to interlock a plurality of portions of the optical system along the optical path of the laser light, for example. Then, the wavefront aberration caused by the variation of the beam diameter is corrected by the phase pattern displayed on the display unit of the spatial light modulator. Thus, it is possible to reduce necessity and restriction of a mechanism that does not cause the wavefront aberration. Therefore, it is possible to simply vary the beam diameter enlarged or reduced by the beam diameter conversion mechanism.

In the laser light irradiation device according to one aspect of the present invention, the controller may display, on the display unit, the phase pattern configured to correct the wavefront aberration caused by the insertion of the lens, in a state in which the lens is inserted in the optical path of the laser light by the lens insertion and removal mechanism. With this configuration, when the lens is inserted in the optical path of the laser light by the lens insertion and removal mechanism, the wavefront aberration caused by the insertion of the lens is corrected by the phase pattern.

In the laser light irradiation device according to one aspect of the present invention, the controller may display, on the display unit, the phase pattern configured to correct the wavefront aberration caused by the removal of the lens, in a state in which the lens is removed from the optical path of the laser light by the lens insertion and removal mechanism. With this configuration, when the lens is removed from the optical path of the laser light by the lens insertion and removal mechanism, the wavefront aberration caused by the removal of the lens is corrected by the phase pattern.

In the laser light irradiation device according to one aspect of the present invention, the lens insertion and removal mechanism may be enabled to slide the lens in a direction crossing the optical path such that a position of the lens is switched between a first state in which the lens is separated from the optical path of the laser light and a second state in which the lens is located on the optical path. In this case, by sliding the lens by the lens insertion and removal mechanism, it is possible to implement insertion and removal of the lens with respect to the optical path of the laser light.

In the laser light irradiation device according to one aspect of the present invention, the lens insertion and removal mechanism may be enabled to rotate a lens holder configured to hold the lens around an axis along the optical path such that a position of the lens is switched between a first state in which the lens is separated from the optical path of the laser light and a second state in which the lens is located on the optical path. In this case, by rotating the lens holder by the lens insertion and removal mechanism, it is possible to implement insertion and removal of the lens with respect to the optical path of the laser light.

The laser light irradiation device according to one aspect of the present invention may form a modified region within the object by setting a converging point within the object and emitting the laser light. In this case, laser processing within the object can be performed.

A laser light irradiation method according to one aspect of the present invention is a laser light irradiation method of emitting a laser light to an object by using a laser light irradiation device, the laser light irradiation device includes:

a laser light source configured to generate the laser light; a spatial light modulator including a display unit configured to display a phase pattern, the spatial light modulator modulating the laser light generated by the laser light source in accordance with the phase pattern displayed on the display unit; and a beam diameter conversion mechanism arranged on an optical path of the laser light between the laser light source and the spatial light modulator, the beam diameter conversion mechanism enlarging or reducing the beam diameter of the laser light, and the laser light irradiation method includes: an insertion and removal step of inserting a lens configured to vary the beam diameter of the laser light in the optical path of the laser light between the laser light source and the spatial light modulator or removing the lens from the optical path; a display step of displaying, on the display unit, the phase pattern configured to correct a wavefront aberration caused by insertion or removal of the lens; and an irradiation step of generating the laser light from the laser light source to emit the laser light to the object, in a state in which the phase pattern is displayed on the display unit by the display step.

In the laser light irradiation method, the lens is inserted in the optical path of the laser light, or the lens is removed from the optical path, and thus, the beam diameter of the laser light is varied without requiring the complicated mechanism configured to interlock the plurality of portions of the optical system along the optical path of the laser light, for example. Then, the wavefront aberration caused by the variation of the beam diameter is corrected by the phase pattern displayed on the display unit of the spatial light modulator. Thus, it is possible to reduce necessity and restriction of a mechanism that does not cause the wavefront aberration. Therefore, it is possible to simply vary the beam diameter enlarged or reduced by the beam diameter conversion mechanism.

Advantageous Effects of Invention

According to one aspect of the present invention, a laser light irradiation device and a laser light irradiation method can be provided enabled to simply vary the beam diameter enlarged or reduced by the beam diameter conversion mechanism.

DESCRIPTION OF EMBODIMENTS

Figure 1:
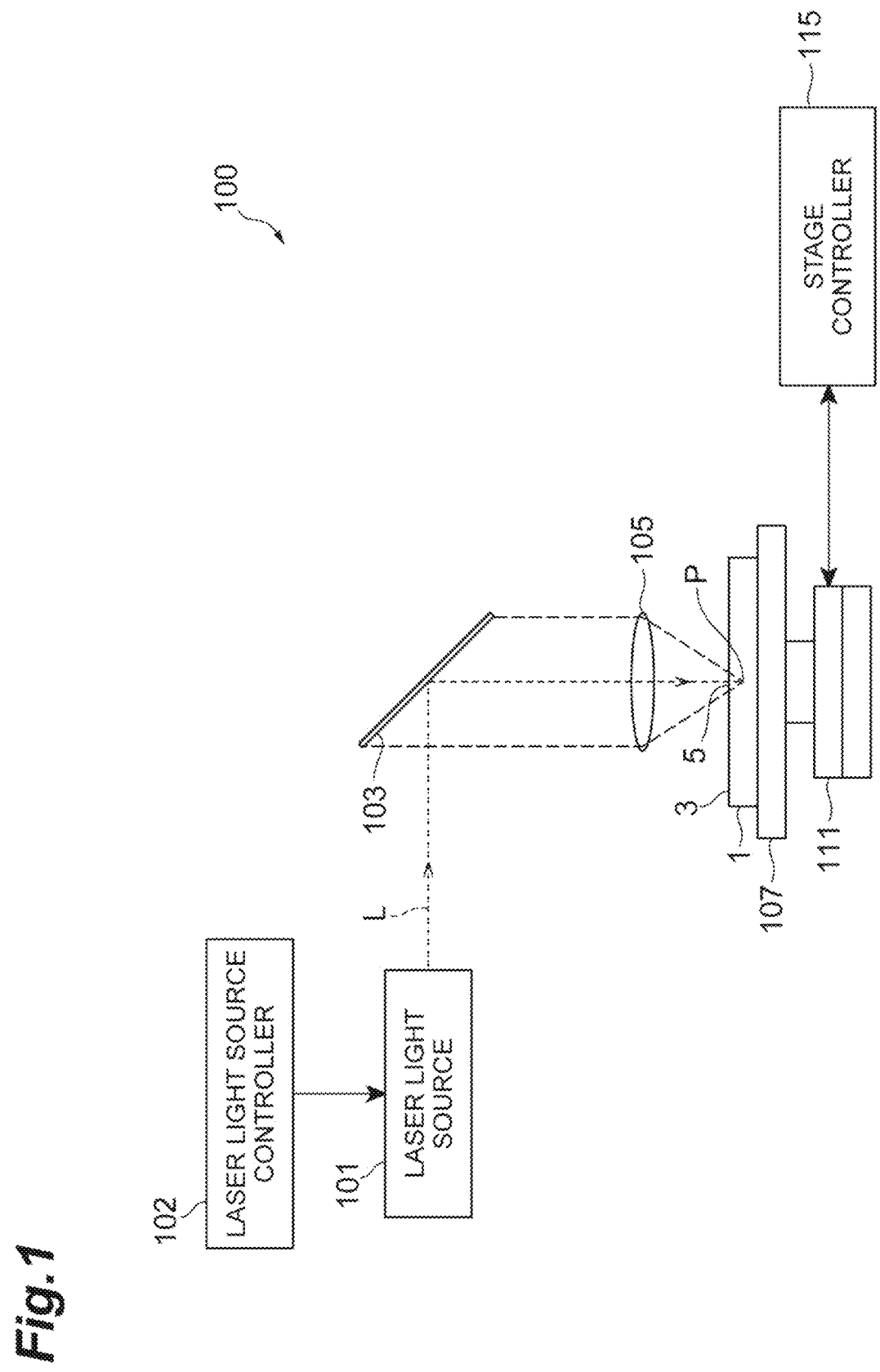
FIG. 1 is a schematic configuration diagram of a laser processing device used for forming a modified region.

In the following, an embodiment will be described in detail with reference to the drawings. In the drawings, the same or equivalent parts will be denoted by the same reference signs, without redundant description.

In a laser processing device (laser light irradiation device) according to the embodiment, laser light is converged at an object to be processed to form a modified region within the object to be processed along a line to cut. Therefore, formation of the modified region will be described at first with reference to FIGS. 1 to 6.

As illustrated in FIG. 1, a laser processing device 100 includes a laser light source 101 configured to cause laser light L to oscillate in a pulsating manner, a dichroic mirror 103 arranged so as to change a direction of the optical axis (optical path) of the laser light L by 90°, and a converging lens 105 configured to converge the laser light L. The laser processing device 100 further includes a support table 107 configured to support an object to be processed 1 that is an object to which the laser light L converged by the converging lens 105 is emitted, a stage 111 that is a moving mechanism configured to move the support table 107, a laser light source controller 102 configured to control the laser light source 101 in order to adjust the output, pulse width, pulse waveform, and the like of the laser light L, and a stage controller 115 configured to control the movement of the stage 111.

In the laser processing device 100, the laser light L emitted from the laser light source 101 changes the direction of its optical axis by 90° with the dichroic mirror 103 and then is converged by the converging lens 105 within the object to be processed 1 mounted on the support table 107. At the same time, the stage 111 is moved, so that the object to be processed 1 moves with respect to the laser light L along a line to cut 5. Thus, a modified region along the line to cut 5 is formed in the object to be processed 1. While the stage 111 is moved here for relatively moving the laser light L, the converging lens 105 may be moved instead or together therewith.

Figure 2:
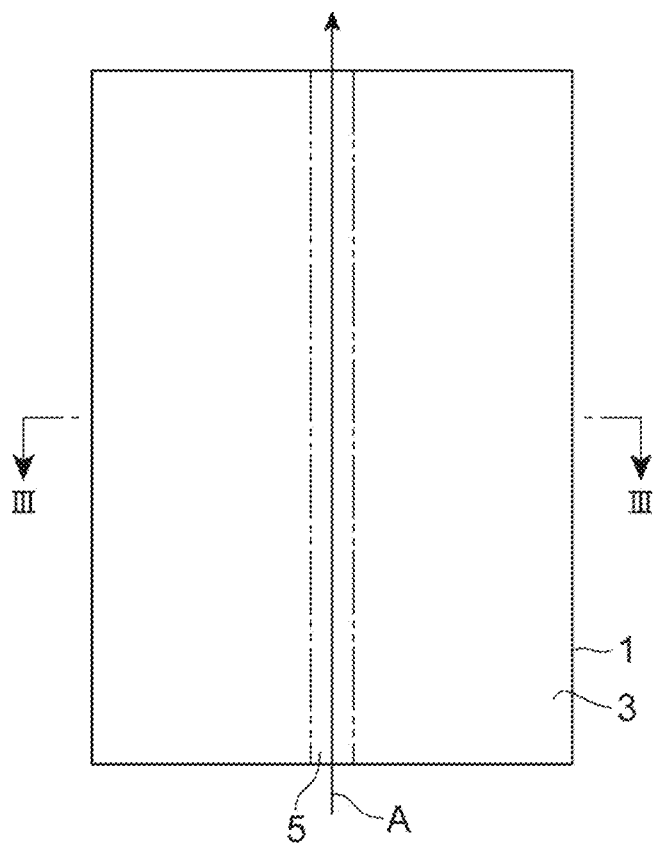
FIG. 2 is a plan view of an object to be processed for which the modified region is formed.
Figure 3:
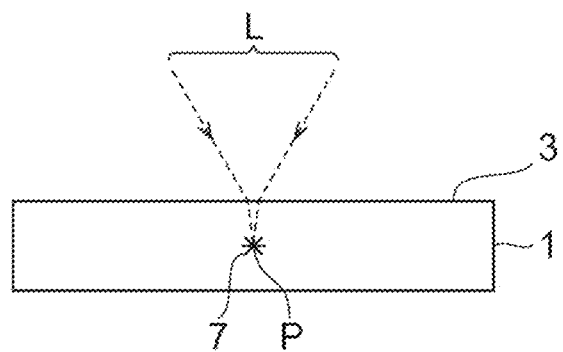
FIG. 3 is a sectional view of the object to be processed taken along the line III-III of FIG. 2.
Figure 4:
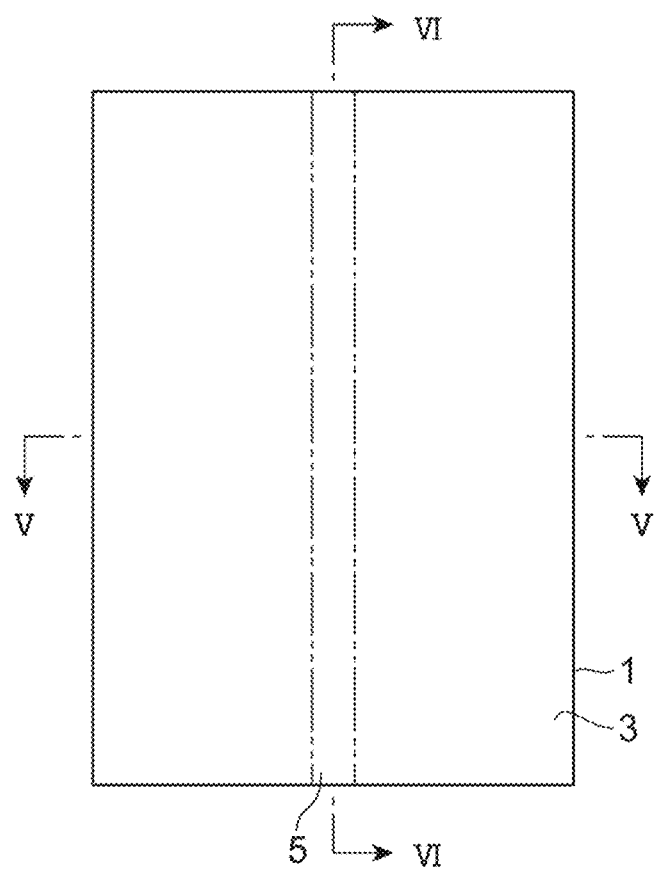
FIG. 4 is a plan view of the object to be processed after laser processing.
Figure 5:
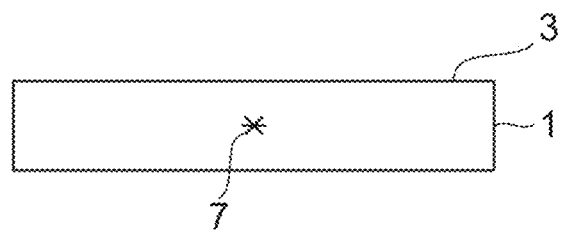
FIG. 5 is a sectional view of the object to be processed taken along the line V-V of FIG. 4.
Figure 6:
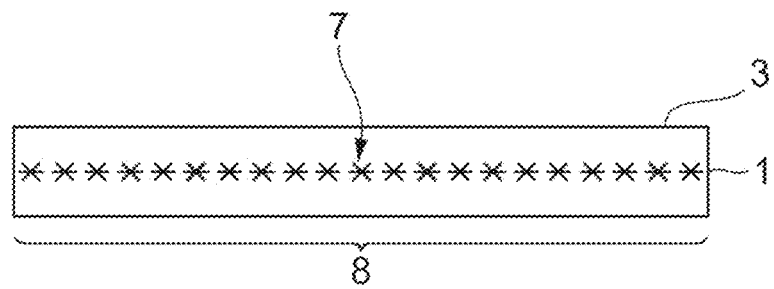
FIG. 6 is a sectional view of the object to be processed taken along the line VI-VI of FIG. 4.

Employed as the object to be processed 1 is a planar member (for example, a substrate or a wafer), examples of which include semiconductor substrates formed of semiconductor materials and piezoelectric substrates formed of piezoelectric materials. As illustrated in FIG. 2, in the object to be processed 1, the line to cut 5 is set for cutting the object to be processed 1. The line to cut 5 is a virtual line extending straight. In a case where a modified region is formed within the object to be processed 1, the laser light L is relatively moved along the line to cut 5 (that is, in the direction of arrow A in FIG. 2) while a converging point (converging position) P is set within the object to be processed 1 as illustrated in FIG. 3. Thus, a modified region 7 is formed within the object to be processed 1 along the line to cut 5 as illustrated in FIGS. 4, 5 and 6, and the modified region 7 formed along the line to cut 5 becomes a cutting start region 8. The line to cut 5 corresponds to an irradiation schedule line.

The converging point P is a position at which the laser light L is converged. The line to cut 5 may be curved instead of being straight, a three-dimensional one combining them, or one specified by coordinates. The line to cut 5 may be one actually drawn on a front surface 3 of the object to be processed 1 without being restricted to the virtual line. The modified region 7 may be formed either continuously or intermittently. The modified region 7 may be formed in either rows or dots, and only needs to be formed at least within the object to be processed 1, on the front surface 3, or on a back surface. A crack may be formed from the modified region 7 as a start point, and the crack and the modified region 7 may be exposed at an outer surface (the front surface 3, the back surface, or an outer peripheral surface) of the object to be processed 1. A laser light entrance surface in forming the modified region 7 is not limited to the front surface 3 of the object to be processed 1 but may be the back surface of the object to be processed 1.

Incidentally, in a case where the modified region 7 is formed within the object to be processed 1, the laser light L is transmitted through the object to be processed 1 and is particularly absorbed near the converging point P located within the object to be processed 1. Thus, the modified region 7 is formed in the object to be processed 1 (that is, internal absorption type laser processing). In this case, the front surface 3 of the object to be processed 1 hardly absorbs the laser light L and thus does not melt. On the other hand, in a case where the modified region 7 is formed on the front surface 3 or the back surface of the object to be processed 1, the laser light L is particularly absorbed near the converging point P located on the front surface 3 or the back surface, and removal portions such as holes and grooves are formed (surface absorption type laser processing) by being melted from the front surface 3 or the back surface and removed.

The modified region 7 is a region in which density, refractive index, mechanical strength and other physical characteristics are different from the surroundings. Examples of the modified region 7 include a molten processed region (meaning at least one of a region resolidified after having been once molten, a region in the molten state, and a region in the process of resolidifying from the molten state), a crack region, a dielectric breakdown region, a refractive index changed region, and a mixed region thereof. Other examples of the modified region 7 include a region where the density of the modified region 7 has changed compared to the density of an unmodified region in a material of the object to be processed 1, and a region formed with a lattice defect. In a case where the material of the object to be processed 1 is single crystal silicon, the modified region 7 can also be said to be a high dislocation density region.

The molten processed region, refractive index changed region, region where the density of the modified region 7 has changed compared to the density of the unmodified region, and region formed with the lattice defect may further incorporate the crack (cracking or microcrack) therewithin or at an interface between the modified region 7 and the unmodified region. The incorporated crack may be formed over the whole surface of the modified region 7 or in only a portion or a plurality of portions thereof. The object to be processed 1 includes a substrate made of a crystalline material having a crystal structure. For example, the object to be processed 1 includes a substrate formed of at least one of gallium nitride (GaN), silicon (Si), silicon carbide (SiC), LiTaO$_3$, and sapphire (Al$_2$O$_3$). In other words, the object to be processed 1 includes, for example, a gallium nitride substrate, a silicon substrate, a SiC substrate, a LiTaO$_3$ substrate, or a sapphire substrate. The crystalline material may be either an anisotropic crystal or an isotropic crystal. Further, the object to be processed 1 may include a substrate made of a non-crystalline material having a non-crystalline structure (amorphous structure), and may include a glass substrate, for example.

In the embodiment, the modified region 7 can be formed by forming a plurality of modified spots (processing marks) along the line to cut 5. In this case, the plurality of modified spots gathers to be the modified region 7. Each of the modified spots is a modified portion formed by a shot of one pulse of pulsed laser light (that is, laser irradiation of one pulse: laser shot). Examples of the modified spots include crack spots, molten processed spots, refractive index changed spots, and those in which at least one of them is mixed. As for the modified spots, their sizes and lengths of the crack occurring therefrom can be controlled as necessary in view of the required cutting accuracy, the required flatness of cut surfaces, the thickness, kind, and crystal orientation of the object to be processed 1, and the like. In addition, in the embodiment, the modified spot can be formed as the modified region 7, along the line to cut 5.

[Laser Processing Device According to Embodiment]

Next, the laser processing device according to the embodiment will be described. In the following description, the directions orthogonal to each other in the horizontal plane are defined as the X-axis direction and the Y-axis direction, and the vertical direction is defined as the Z-axis direction.

[Overall Configuration of Laser Processing Device]

Figure 7:
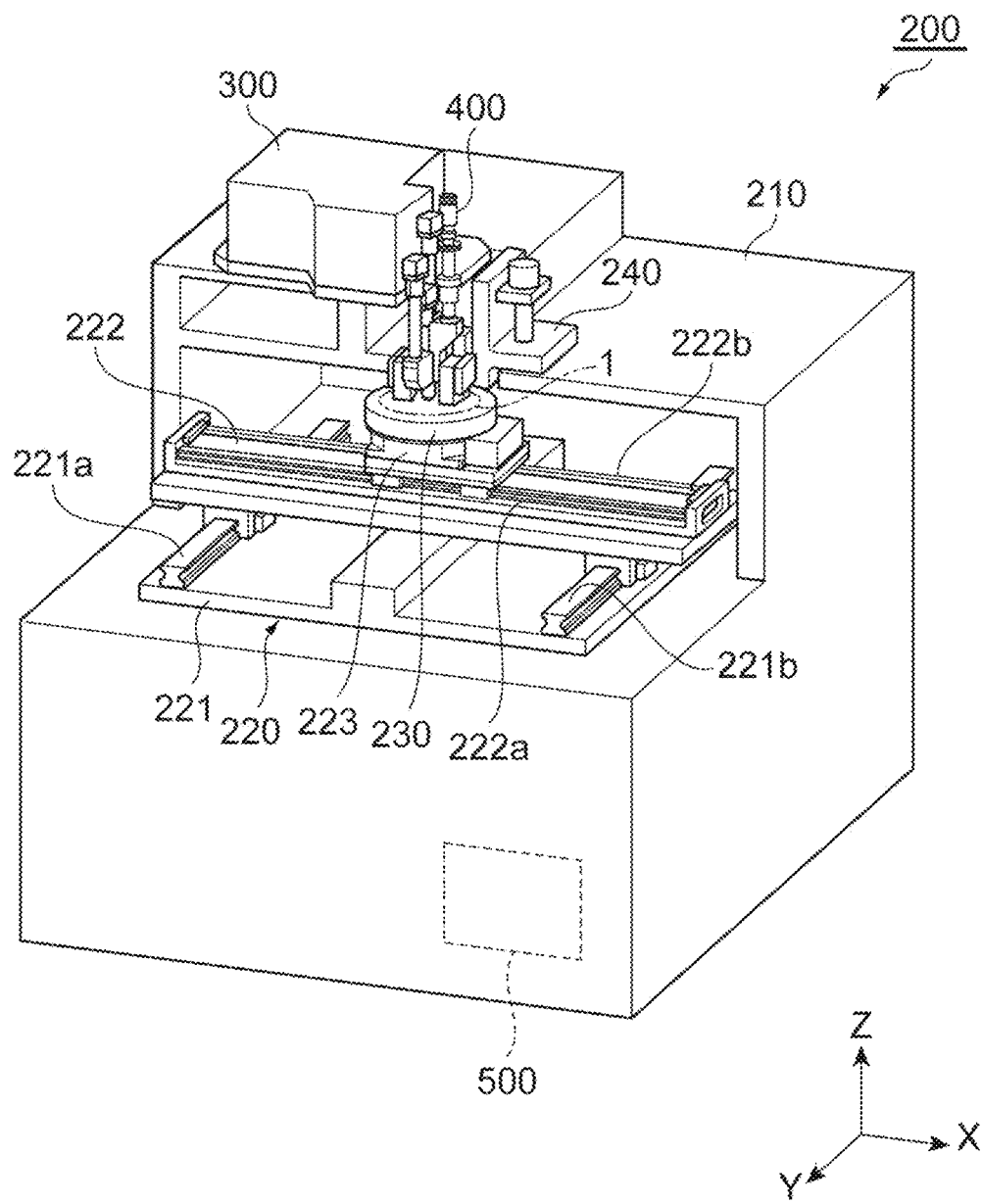
FIG. 7 is a perspective view of a laser processing device according to an embodiment.

As illustrated in FIG. 7, a laser processing device 200 includes a device frame 210, a first moving mechanism 220, a support table 230, and a second moving mechanism 240. Further, the laser processing device 200 includes a laser output unit 300, a laser converging unit 400, and a controller 500.

The first moving mechanism 220 is attached to the device frame 210. The first moving mechanism 220 includes a first rail unit 221, a second rail unit 222, and a movable base 223. The first rail unit 221 is attached to the device frame 210. The first rail unit 221 is provided with a pair of rails 221a and 221b extending along the Y-axis direction. The second rail unit 222 is attached to the pair of rails 221a and 221b of the first rail unit 221 so as to be movable along the Y-axis direction. The second rail unit 222 is provided with a pair of rails 222a and 222b extending along the X-axis direction. The movable base 223 is attached to the pair of rails 222a and 222b of the second rail unit 222 so as to be movable along the X-axis direction. The movable base 223 is rotatable about an axis parallel to the Z-axis direction as the center.

Figure 8:
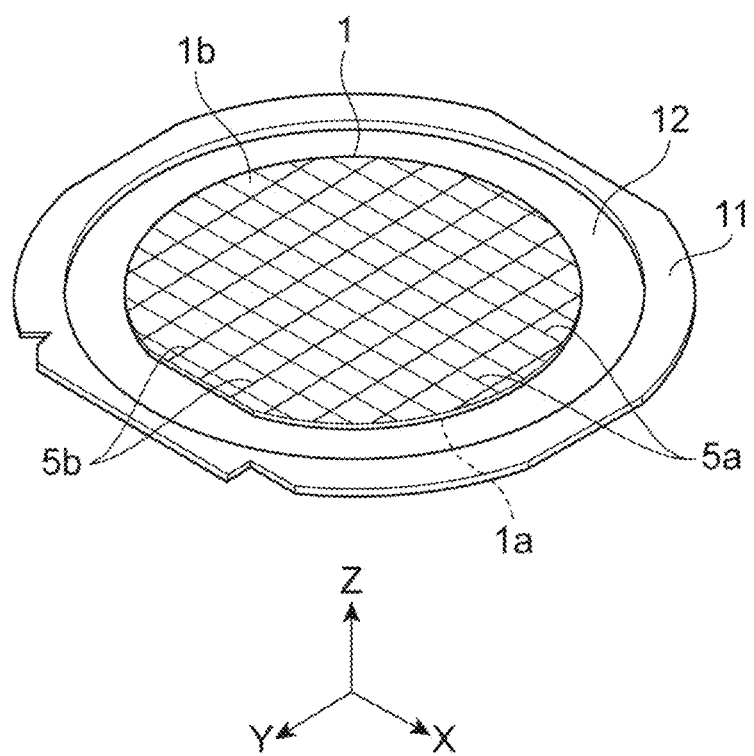
FIG. 8 is a perspective view of an object to be processed attached to a support table of the laser processing device of FIG. 7.

The support table 230 is attached to the movable base 223. The support table 230 supports the object to be processed 1. The object to be processed 1 includes a plurality of functional devices (a light receiving device such as a photodiode, a light emitting device such as a laser diode, a circuit device formed as a circuit, or the like) formed in a matrix shape on the front surface side of a substrate made of a semiconductor material such as silicon. When the object to be processed 1 is supported on the support table 230, as illustrated in FIG. 8, on a film 12 stretched over an annular frame 11, for example, a front surface 1a of the object to be processed 1 (a surface of the plurality of functional devices side) is pasted. The support table 230 holds the frame 11 with a clamp and suctions the film 12 with a vacuum chuck table, to support the object to be processed 1. On the support table 230, a plurality of lines to cut 5a parallel to each other and a plurality of lines to cut 5b parallel to each other are set in a grid pattern so as to pass between adjacent functional devices on the object to be processed 1.

As illustrated in FIG. 7, the support table 230 is moved along the Y-axis direction by operation of the second rail unit 222 in the first moving mechanism 220. In addition, the support table 230 is moved along the X-axis direction by operation of the movable base 223 in the first moving mechanism 220. Further, the support table 230 is rotated about the axis parallel to the Z-axis direction as the center by operation of the movable base 223 in the first moving mechanism 220. As described above, the support table 230 is attached to the device frame 210 to be movable along the X-axis direction and the Y-axis direction, and to be rotatable about the axis parallel to the Z-axis direction as the center.

The laser output unit 300 is attached to the device frame 210. The laser converging unit 400 is attached to the device frame 210 via the second moving mechanism 240. The laser converging unit 400 is moved along the Z-axis direction by operation of the second moving mechanism 240. As described above, the laser converging unit 400 is attached to the device frame 210 so as to be movable along the Z-axis direction with respect to the laser output unit 300.

The controller 500 includes a Central Processing Unit (CPU), Read Only Memory (ROM), Random Access Memory (RAM), and the like. The controller 500 controls operation of each unit of the laser processing device 200.

As an example, in the laser processing device 200, a modified region is formed within the object to be processed 1 along each of the lines to cut 5a and 5b (see FIG. 8) as follows.

First, the object to be processed 1 is supported on the support table 230 such that a back surface 1b (see FIG. 8) of the object to be processed 1 becomes the laser light entrance surface, and each of the lines to cut 5a of the object to be processed 1 is aligned in a direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each of the lines to cut 5a. Thus, the modified region is formed within the object to be processed 1 along each of the lines to cut 5a.

When the formation of the modified region along each of the lines to cut 5a is completed, the support table 230 is rotated by the first moving mechanism 220, and each of the lines to cut 5b of the object to be processed 1 is aligned in the direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each of the lines to cut 5b. Thus, the modified region is formed within the object to be processed 1 along each of the lines to cut 5b.

As described above, in the laser processing device 200, the direction parallel to the X-axis direction is a processing direction (scanning direction of the laser light L). The relative movement of the converging point of the laser light L along each of the lines to cut 5a and the relative movement of the converging point of the laser light L along each of the lines to cut 5b are performed by the movement of the support table 230 along the X-axis direction by the first moving mechanism 220. In addition, the relative movement of the converging point of the laser light L between the lines to cut 5a and the relative movement of the converging point of the laser light L between the lines to cut 5b are performed by the movement of the support table 230 along the Y-axis direction by the first moving mechanism 220.

Figure 9:
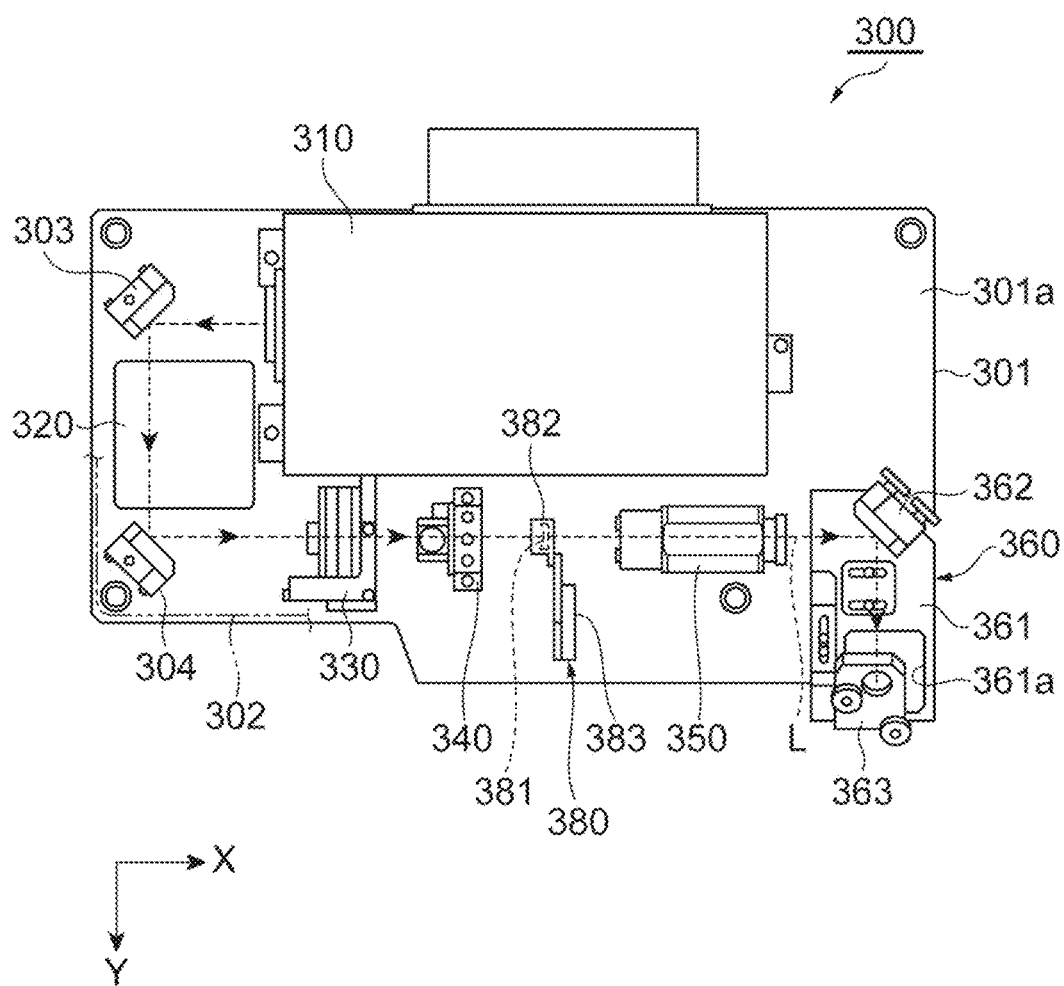
FIG. 9 is a sectional view of a laser output unit taken along the ZX plane of FIG. 7.

As illustrated in FIG. 9, the laser output unit 300 includes a mounting base 301, a cover 302, and a plurality of mirrors 303 and 304. Further, the laser output unit 300 includes a laser oscillator (laser light source) 310, a shutter 320, a $\lambda/2$ wave plate unit 330, a polarizing plate unit 340, a beam expander (beam diameter conversion mechanism) 350, a mirror unit 360, and a lens insertion and removal mechanism 380.

The mounting base 301 supports the plurality of mirrors 303 and 304, the laser oscillator 310, the shutter 320, the $\lambda/2$ wave plate unit 330, the polarizing plate unit 340, the beam expander 350, the mirror unit 360, and the lens insertion and removal mechanism 380. The plurality of mirrors 303 and 304, the laser oscillator 310, the shutter 320, the $\lambda/2$ wave plate unit 330, the polarizing plate unit 340, the beam expander 350, the mirror unit 360, and the lens insertion and removal mechanism 380 are attached to a main surface 301a of the mounting base 301. The mounting base 301 is a planar member and is detachable with respect to the device frame 210 (see FIG. 7). The laser output unit 300 is attached to the device frame 210 via the mounting base 301. That is, the laser output unit 300 is detachable with respect to the device frame 210.

The cover 302 covers the plurality of mirrors 303 and 304, the laser oscillator 310, the shutter 320, the $\lambda/2$ wave plate unit 330, the polarizing plate unit 340, the beam expander 350, the mirror unit 360, and the lens insertion and removal mechanism 380 on the main surface 301a of the mounting base 301. The cover 302 is detachable with respect to the mounting base 301.

The laser oscillator 310 oscillates linearly polarized laser light L in a pulsating manner along the X-axis direction. The wavelength of the laser light L emitted from the laser oscillator 310 is included in any of the wavelength bands of from 500 nm to 550 nm, from 1000 nm to 1150 nm, or from 1300 nm to 1400 nm. The laser light L in the wavelength band of from 500 nm to 550 nm is suitable for internal absorption type laser processing on a substrate made of sapphire, for example. The laser light L in each of the wavelength bands of from 1000 nm to 1150 nm and from 1300 nm to 1400 nm is suitable for internal absorption type laser processing for a substrate made of silicon, for example. The polarization direction of the laser light L emitted from the laser oscillator 310 is, for example, a direction parallel to the Y-axis direction. The laser light L emitted from the laser oscillator 310 is reflected by the mirror 303 and enters the shutter 320 along the Y-axis direction.

In the laser oscillator 310, ON/OFF of the output of the laser light L is switched as follows. In a case where the laser oscillator 310 includes a solid state laser, ON/OFF of a Q switch (acousto-optic modulator (AOM), electro-optic modulator (EOM), or the like) provided in a resonator is switched, whereby ON/OFF of the output of the laser light L is switched at high speed. In a case where the laser oscillator 310 includes a fiber laser, ON/OFF of the output of a semiconductor laser constituting a seed laser and an amplifier (excitation) laser is switched, whereby ON/OFF of the output of the laser light L is switched at high speed. In a case where the laser oscillator 310 uses an external modulation device, ON/OFF of the external modulation device (AOM, EOM, or the like) provided outside the resonator is switched, whereby ON/OFF of the output of the laser light L is switched at high speed.

The shutter 320 opens and closes the optical path of the laser light L by a mechanical mechanism. Switching ON/OFF of the output of the laser light L from the laser output unit 300 is performed by switching ON/OFF of the output of the laser light L in the laser oscillator 310 as described above, and the shutter 320 is provided, whereby the laser light L is prevented from being unexpectedly emitted from the laser output unit 300, for example. The laser light L having passed through the shutter 320 is reflected by the mirror 304 and sequentially enters the $\lambda/2$ wave plate unit 330 and the polarizing plate unit 340 along the X-axis direction.

The $\lambda/2$ wave plate unit 330 and the polarizing plate unit 340 each function as the output adjusting unit configured to adjust the output (light intensity) of the laser light L. In addition, the $\lambda/2$ wave plate unit 330 and the polarizing plate unit 340 each function as the polarization direction adjusting unit configured to adjust the polarization direction of the laser light L. The laser light L having sequentially passed through the $\lambda/2$ wave plate unit 330 and the polarizing plate unit 340 enters the beam expander 350 along the X-axis direction.

The beam expander 350 collimates the laser light L while adjusting the diameter of the laser light L. The laser light L having passed through the beam expander 350 enters the mirror unit 360 along the X-axis direction.

The mirror unit 360 includes a support base 361 and a plurality of mirrors 362 and 363. The support base 361 supports the plurality of mirrors 362 and 363. The support base 361 is attached to the mounting base 301 so as to be position adjustable along the X-axis direction and the Y-axis direction. The mirror (first mirror) 362 reflects the laser light L having passed through the beam expander 350 in the Y-axis direction. The mirror 362 is attached to the support base 361 such that its reflective surface is angle adjustable around an axis parallel to the Z-axis, for example. The mirror (second mirror) 363 reflects the laser light L reflected by the mirror 362 in the Z-axis direction. The minor 363 is attached to the support base 361 such that its reflective surface is angle adjustable around an axis parallel to the X-axis, for example, and is position adjustable along the Y-axis direction. The laser light L reflected by the mirror 363 passes through an opening 361a formed in the support base 361 and enters the laser converging unit 400 (see FIG. 7) along the Z-axis direction. That is, an emission direction of the laser light L by the laser output unit 300 coincides with a moving direction of the laser converging unit 400. As described above, each of the mirrors 362 and 363 includes a mechanism configured to adjust the angle of the reflective surface. In the mirror unit 360, the position adjustment of the support base 361 with respect to the mounting base 301, the position adjustment of the minor 363 with respect to the support base 361, and the angle adjustment of the reflective surface of each of the mirrors 362 and 363 are performed, whereby the position and angle of the optical axis of the laser light L emitted from the laser output unit 300 are aligned with respect to the laser converging unit 400. That is, each of the plurality of mirrors 362 and 363 is a component configured to adjust the optical axis of the laser light L emitted from the laser output unit 300.

The lens insertion and removal mechanism 380 is enabled to insert an insertion and removal lens (lens) 381 on the optical path (optical axis) of the laser light L between the polarizing plate unit 340 and the beam expander 350, and is enabled to remove the lens from the optical path. Details of the lens insertion and removal mechanism 380 will be described later.

Figure 10:
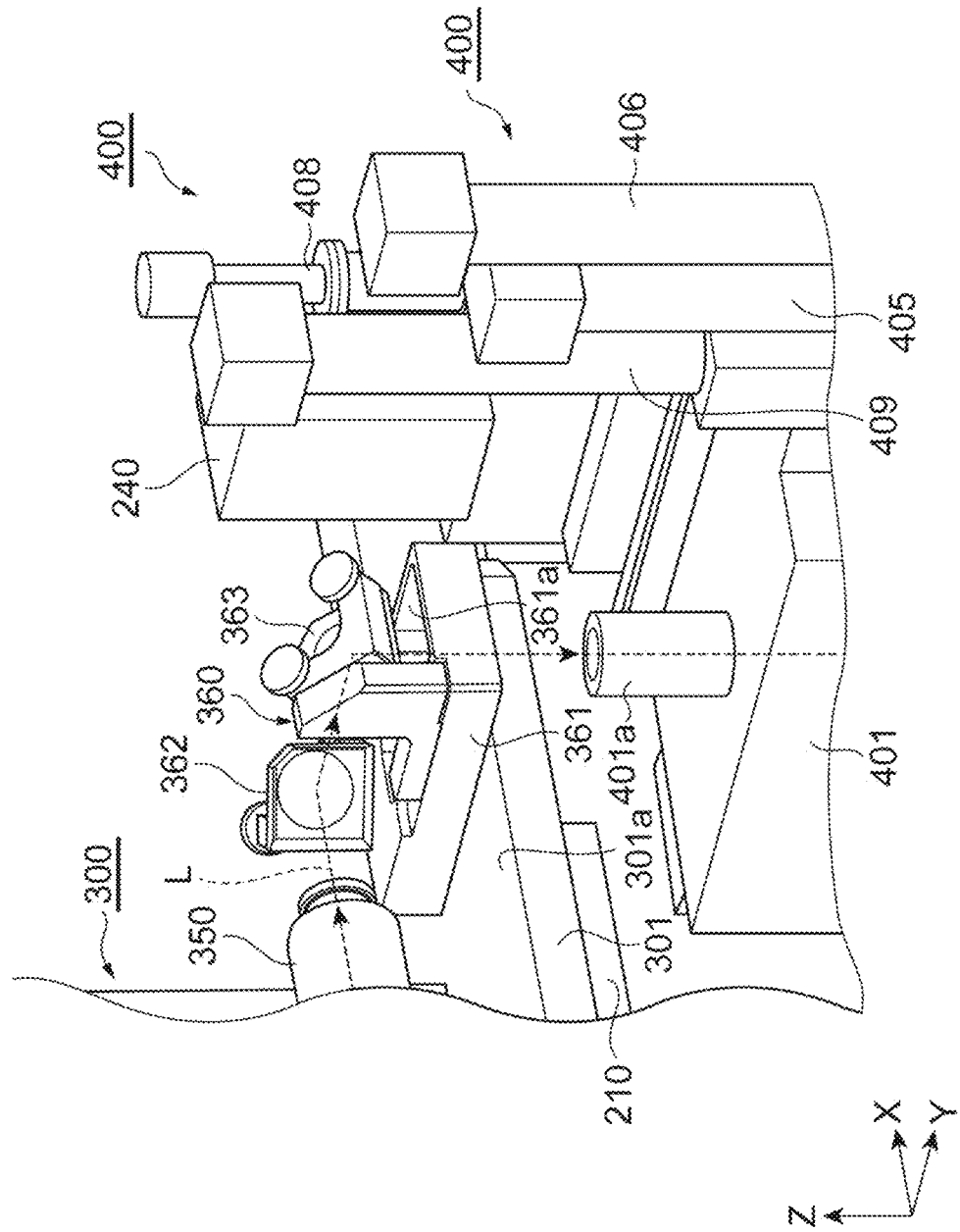
FIG. 10 is a perspective view of a part of the laser output unit and a laser converging unit in the laser processing device of FIG. 7.

As illustrated in FIG. 10, the laser converging unit 400 includes a housing 401. The housing 401 has a rectangular parallelepiped shape with the Y-axis direction as the longitudinal direction. The second moving mechanism 240 is attached to one side surface 401e of the housing 401 (see FIGS. 11 and 13). A cylindrical light entrance unit 401a is provided in the housing 401 so as to face the opening 361a of the mirror unit 360 in the Z-axis direction. The light entrance unit 401a allows the laser light L emitted from the laser output unit 300 to enter the housing 401. The mirror unit 360 and the light entrance unit 401a are separated from each other by a distance in which mutual contact does not occur when the laser converging unit 400 is moved along the Z-axis direction by the second moving mechanism 240.

Figure 11:
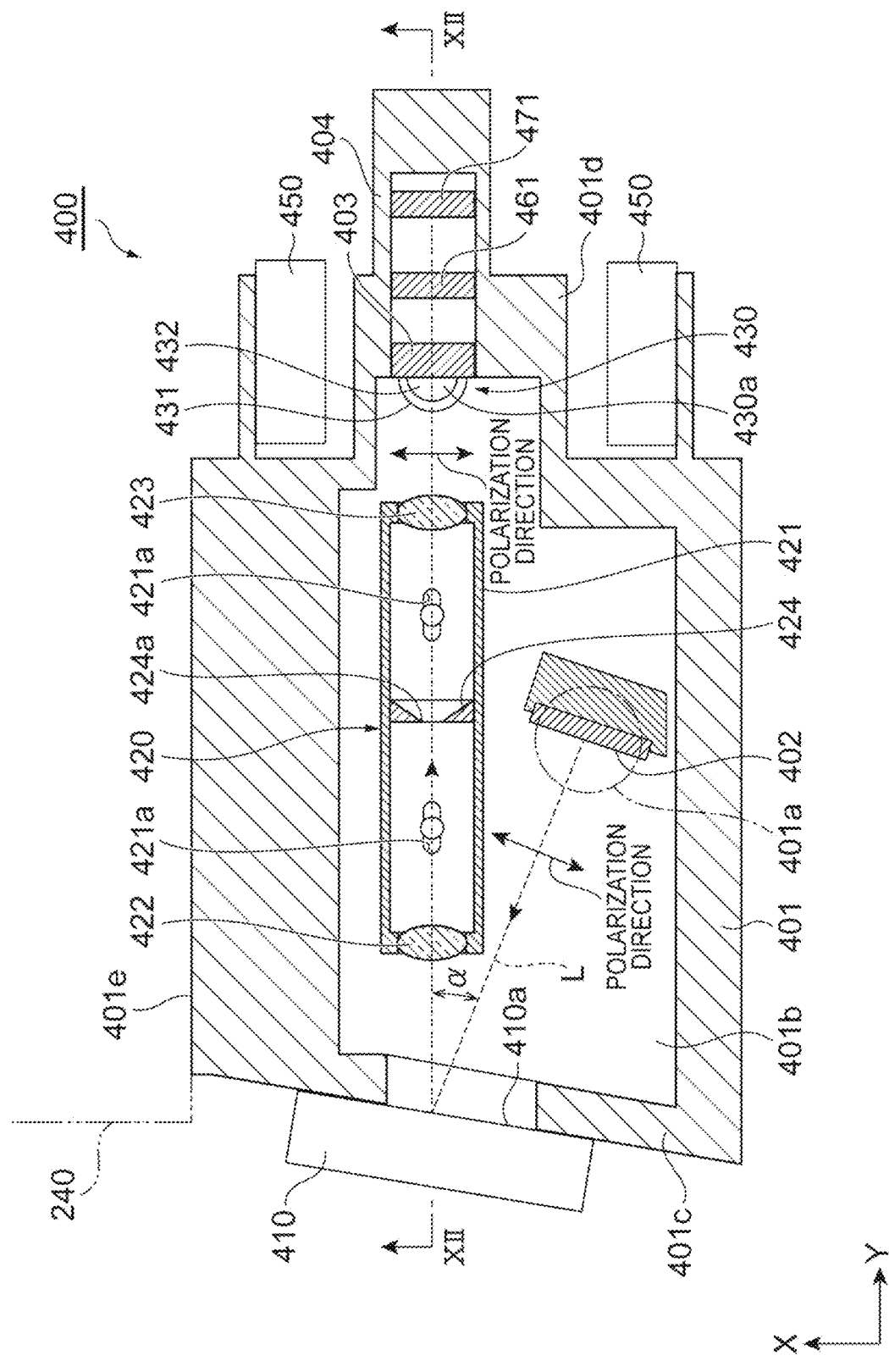
FIG. 11 is a sectional view of the laser converging unit taken along the YZ plane of FIG. 7.
Figure 12:
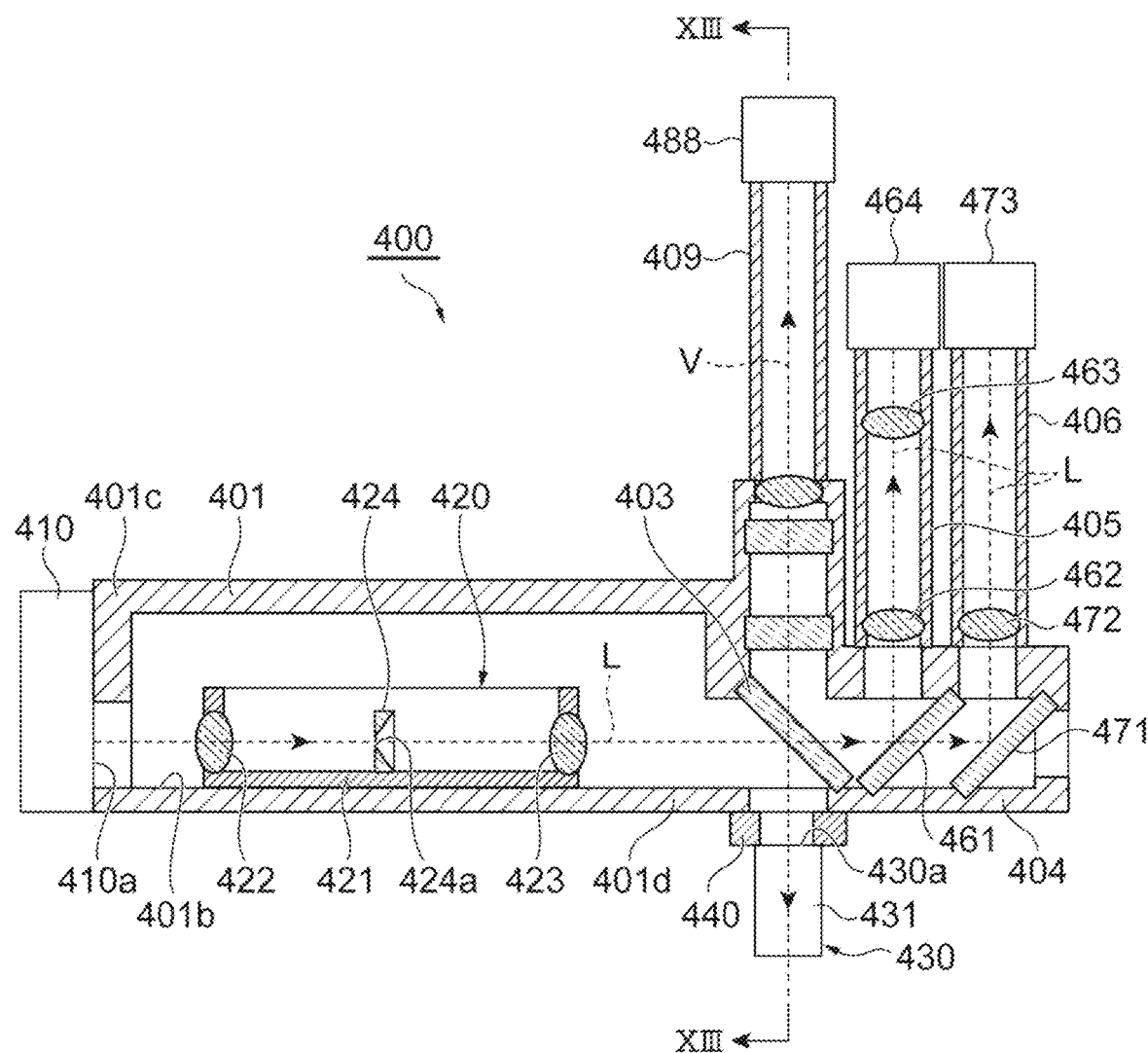
FIG. 12 is a sectional view of the laser converging unit taken along the line XII-XII of FIG. 11.

As illustrated in FIGS. 11 and 12, the laser converging unit 400 includes a mirror 402 and a dichroic mirror 403. Further, the laser converging unit 400 includes a reflective spatial light modulator 410, a 4f lens unit 420, a converging lens unit (converging optical system) 430, a drive mechanism 440, and a pair of distance measuring sensors 450.

The mirror 402 is attached to a bottom surface 401b of the housing 401 so as to face the light entrance unit 401a in the Z-axis direction. The mirror 402 reflects the laser light L having entered the housing 401 via the light entrance unit 401a in a direction parallel to the XY plane. The laser light L collimated by the beam expander 350 of the laser output unit 300 enters the mirror 402 along the Z-axis direction. That is, the laser light L as parallel light enters the mirror 402 along the Z-axis direction. For that reason, even if the laser converging unit 400 is moved along the Z-axis direction by the second moving mechanism 240, a constant state is maintained of the laser light L entering the mirror 402 along the Z-axis direction. The laser light L reflected by the mirror 402 enters the reflective spatial light modulator 410.

The reflective spatial light modulator 410 is attached to an end 401c of the housing 401 in the Y-axis direction in a state where the reflective surface 410a faces the inside of the housing 401. The reflective spatial light modulator 410 is, for example, a reflective liquid crystal (Liquid Crystal on Silicon (LCOS)) Spatial Light Modulator (SLM), and reflects the laser light L in the Y-axis direction while modulating the laser light L. The laser light L modulated and reflected by the reflective spatial light modulator 410 enters the 4f lens unit 420 along the Y-axis direction. Here, in a plane parallel to the XY plane, an angle α formed by an optical axis of the laser light L entering the reflective spatial light modulator 410 and an optical axis of the laser light L emitted from the reflective spatial light modulator 410, is an acute angle (for example, from 10° to 60°. That is, the laser light L is reflected at an acute angle along the XY plane by the reflective spatial light modulator 410. This is for suppressing an incident angle and a reflection angle of the laser light L to inhibit the degradation of diffraction efficiency, and for sufficiently exerting performance of the reflective spatial light modulator 410. Note that, in the reflective spatial light modulator 410, for example, the thickness of a light modulation layer in which a liquid crystal is used is extremely thin as several micrometers to several tens of micrometers, so that the reflective surface 410a can be regarded as substantially the same as a light entering and exiting surface of the light modulation layer.

The 4f lens unit 420 includes a holder 421, a lens 422 on the reflective spatial light modulator 410 side, a lens 423 on the converging lens unit 430 side, and a slit member 424. The holder 421 holds a pair of the lenses 422 and 423 and the slit member 424. The holder 421 maintains a constant mutual positional relationship between the pair of lenses 422 and 423 and the slit member 424 in a direction along the optical axis of the laser light L. The pair of lenses 422 and 423 constitutes a double telecentric optical system in which the reflective surface 410a of the reflective spatial light modulator 410 and an entrance pupil plane (pupil plane) 430a of the converging lens unit 430 are in an imaging relationship. Thus, an image of the laser light L on the reflective surface 410a of the reflective spatial light modulator 410 (an image of the laser light L modulated in the reflective spatial light modulator 410) is transferred to (imaged on) the entrance pupil plane 430a of the converging lens unit 430. A slit 424a is formed in the slit member 424. The slit 424a is located between the lens 422 and the lens 423 and near a focal plane of the lens 422. Unnecessary part of the laser light L modulated and reflected by the reflective spatial light modulator 410 is blocked by the slit member 424. The laser light L having passed through the 4f lens unit 420 enters the dichroic mirror 403 along the Y-axis direction.

The dichroic mirror 403 reflects most (for example, from 95% to 99.5%) of the laser light L in the Z-axis direction and transmits part (for example, from 0.5% to 5%) of the laser light L along the Y-axis direction. Most of the laser light L is reflected at a right angle along the ZX plane by the dichroic mirror 403. The laser light L reflected by the dichroic mirror 403 enters the converging lens unit 430 along the Z-axis direction.

The converging lens unit 430 is attached to an end 401d (an end on the opposite side from the end 401c) of the housing 401 in the Y-axis direction via the drive mechanism 440. The converging lens unit 430 includes a holder 431 and a plurality of lenses 432. The holder 431 holds the plurality of lenses 432. The plurality of lenses 432 converges the laser light L at the object to be processed 1 (see FIG. 7) supported by the support table 230. The drive mechanism 440 moves the converging lens unit 430 along the Z-axis direction by driving force of a piezoelectric device.

The pair of distance measuring sensors 450 is attached to the end 401d of the housing 401 so as to be respectively located on both sides of the converging lens unit 430 in the X-axis direction. Each of the distance measuring sensors 450 emits light for distance measurement (for example, laser light) to the laser light entrance surface of the object to be processed 1 (see FIG. 7) supported by the support table 230, and detects the light for distance measurement reflected by the laser light entrance surface, thereby acquiring displacement data of the laser light entrance surface of the object to be processed 1. Note that, for the distance measuring sensors 450, sensors can be used of a triangulation method, a laser confocal method, a white confocal method, a spectral interference method, an astigmatism method, and the like.

In the laser processing device 200, as described above, the direction parallel to the X-axis direction is the processing direction (scanning direction of the laser light L). For that reason, when the converging point of the laser light L is relatively moved along each of the lines to cut 5a and 5b, out of the pair of distance measuring sensors 450, one of the distance measuring sensors 450 being relatively advanced with respect to the converging lens unit 430 acquires the displacement data of the laser light entrance surface of the object to be processed 1 along each of the lines to cut 5a and 5b. Then, the drive mechanism 440 moves the converging lens unit 430 along the Z-axis direction on the basis of the displacement data acquired by the distance measuring sensors 450 such that a constant distance is maintained between the laser light entrance surface of the object to be processed 1 and the converging point of the laser light L.

The laser converging unit 400 includes a beam splitter 461, a pair of lenses 462 and 463, and a profile acquisition camera (intensity distribution acquisition unit) 464. The beam splitter 461 divides the laser light L transmitted through the dichroic mirror 403 into a reflection component and a transmission component. The laser light L reflected by the beam splitter 461 sequentially enters the pair of lenses 462 and 463, and the profile acquisition camera 464 along the Z-axis direction. The pair of lenses 462 and 463 constitutes a double telecentric optical system in which the entrance pupil plane 430a of the converging lens unit 430 and an imaging surface of the profile acquisition camera 464 are in an imaging relationship. Thus, an image of the laser light L on the entrance pupil plane 430a of the converging lens unit 430 is transferred to (imaged on) the imaging surface of the profile acquisition camera 464. As described above, the image of the laser light L on the entrance pupil plane 430a of the converging lens unit 430 is the image of the laser light L modulated in the reflective spatial light modulator 410. Therefore, in the laser processing device 200, an imaging result by the profile acquisition camera 464 is monitored, whereby an operation state of the reflective spatial light modulator 410 can be grasped.

Further, the laser converging unit 400 includes a beam splitter 471, a lens 472, and a camera 473 for monitoring an optical axis position of the laser light L. The beam splitter 471 divides the laser light L transmitted through the beam splitter 461 into a reflection component and a transmission component. The laser light L reflected by the beam splitter 471 sequentially enters the lens 472 and the camera 473 along the Z-axis direction. The lens 472 converges the laser light L having entered, on an imaging surface of the camera 473. In the laser processing device 200, while an imaging result by each of the cameras 464 and 473 is monitored, in the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed (see FIGS. 9 and 10), whereby a shift can be corrected of the optical axis of the laser light L entering the converging lens unit 430 (a positional shift of intensity distribution of the laser light with respect to the converging lens unit 430, and an angular shift of the optical axis of the laser light L with respect to the converging lens unit 430).

The plurality of beam splitters 461 and 471 is arranged in a cylindrical body 404 extending along the Y-axis direction from the end 401d of the housing 401. The pair of lenses 462 and 463 is arranged in a cylindrical body 405 erected on the cylindrical body 404 along the Z-axis direction, and the profile acquisition camera 464 is arranged at an end of the cylindrical body 405. The lens 472 is arranged in a cylindrical body 406 erected on the cylindrical body 404 along the Z-axis direction, and the camera 473 is arranged at an end of the cylindrical body 406. The cylindrical body 405 and the cylindrical body 406 are arranged side by side in the Y-axis direction. Note that, the laser light L transmitted through the beam splitter 471 may be absorbed by a damper or the like provided at an end of the cylindrical body 404, or may be used for an appropriate purpose.

Figure 13:
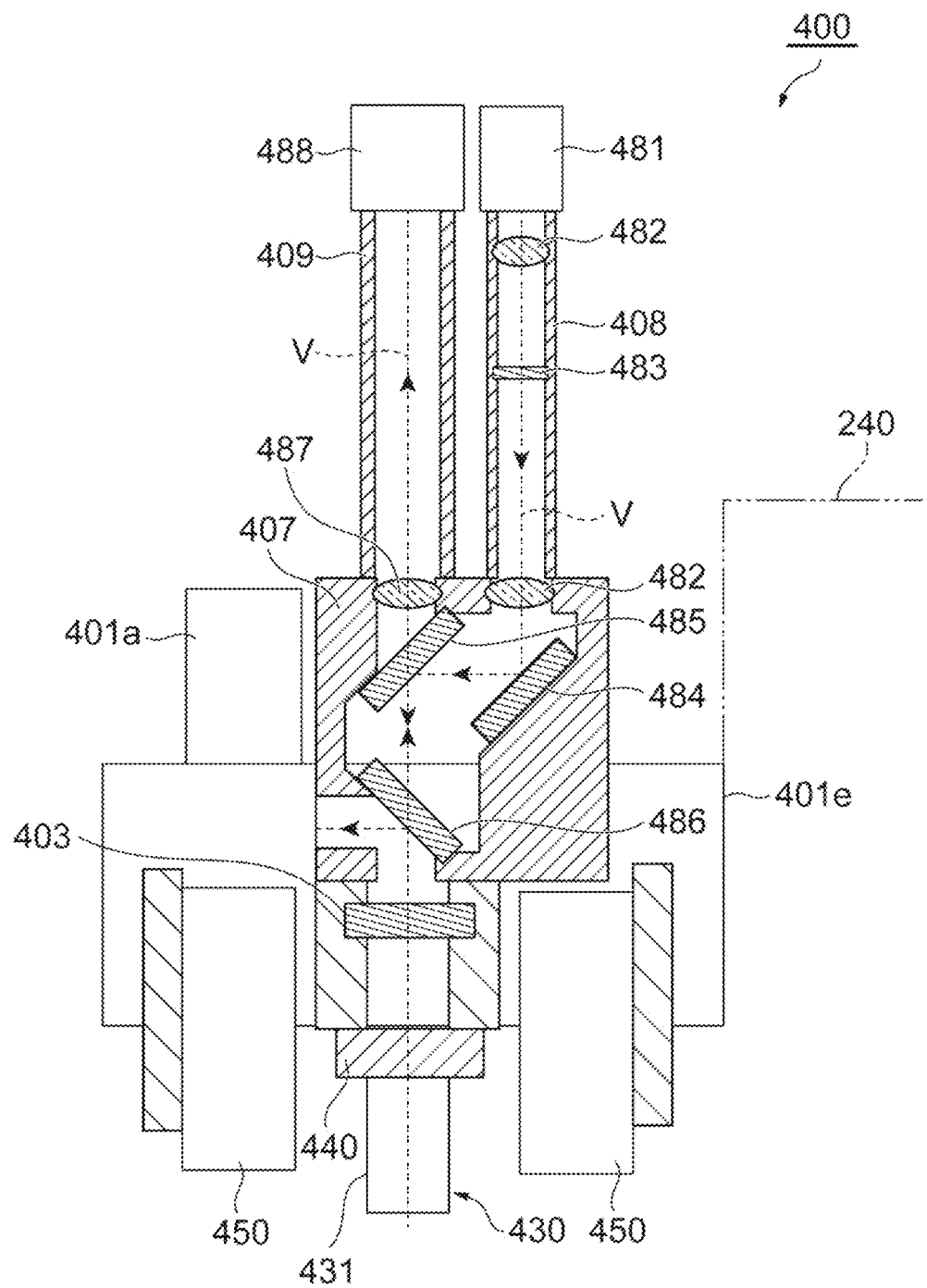
FIG. 13 is a sectional view of the laser converging unit taken along the line XIII-XIII of FIG. 12.

As illustrated in FIGS. 12 and 13, the laser converging unit 400 includes a visible light source 481, a plurality of lenses 482, a reticle 483, a mirror 484, a semitransparent mirror 485, a beam splitter 486, a lens 487, and an observation camera 488. The visible light source 481 emits visible light V along the Z-axis direction. The plurality of lenses 482 collimates the visible light V emitted from the visible light source 481. The reticle 483 gives a scale line to the visible light V. The mirror 484 reflects the visible light V collimated by the plurality of lenses 482 in the X-axis direction. The semitransparent mirror 485 divides the visible light V reflected by the mirror 484 into a reflection component and a transmission component. The visible light V reflected by the semitransparent mirror 485 is sequentially transmitted through the beam splitter 486 and the dichroic mirror 403 along the Z-axis direction, and is emitted via the converging lens unit 430 to the object to be processed 1 supported by the support table 230 (See FIG. 7).

The visible light V emitted to the object to be processed 1 is reflected by the laser light entrance surface of the object to be processed 1, enters the dichroic mirror 403 via the converging lens unit 430, and is transmitted through the dichroic mirror 403 along the Z-axis direction. The beam splitter 486 divides the visible light V transmitted through the dichroic mirror 403 into a reflection component and a transmission component. The visible light V transmitted through the beam splitter 486 is transmitted through the semitransparent mirror 485 and sequentially enters the lens 487 and the observation camera 488 along the Z-axis direction. The lens 487 converges the visible light V having entered, on an imaging surface of the observation camera 488. In the laser processing device 200, an imaging result by the observation camera 488 is observed, whereby a state of the object to be processed 1 can be grasped.

The mirror 484, the semitransparent mirror 485, and the beam splitter 486 are arranged in a holder 407 attached on the end 401d of the housing 401. The plurality of lenses 482 and the reticle 483 are arranged in a cylindrical body 408 erected on the holder 407 along the Z-axis direction, and the visible light source 481 is arranged at an end of the cylindrical body 408. The lens 487 is arranged in a cylindrical body 409 erected on the holder 407 along the Z-axis direction, and the observation camera 488 is arranged at an end of the cylindrical body 409. The cylindrical body 408 and the cylindrical body 409 are arranged side by side in the X-axis direction. Note that, each of the visible light V transmitted through the semitransparent mirror 485 along the X-axis direction and the visible light V reflected in the X-axis direction by the beam splitter 486 may be absorbed by a damper or the like provided on a wall portion of the holder 407, or may be used for an appropriate purpose.

In the laser processing device 200, replacement of the laser output unit 300 is assumed. This is because the wavelength of the laser light L suitable for processing varies depending on the specifications of the object to be processed 1, processing conditions, and the like. For that reason, a plurality of the laser output units 300 is prepared having respective wavelengths of emitting a laser light L different from each other. Here, prepared are the laser output unit 300 in which the wavelength of the emitting laser light L is included in the wavelength band of from 500 run to 550 nm, the laser output unit 300 in which the wavelength of the emitting laser light L is included in the wavelength band of from 1000 nm to 1150 nm, and the laser output unit 300 in which the wavelength of the emitting laser light L is included in the wavelength band of from 1300 nm to 1400 nm.

On the other hand, in the laser processing device 200, replacement of the laser converging unit 400 is not assumed. This is because the laser converging unit 400 is adapted to multiple wavelengths (adapted to a plurality of wavelength bands not continuous with each other). Specifically, the mirror 402, the reflective spatial light modulator 410, the pair of lenses 422 and 423 of the 4f lens unit 420, the dichroic mirror 403, the lens 432 of the converging lens unit 430, and the like are adapted to the multiple wavelengths. Here, the laser converging unit 400 is adapted to the wavelength bands of from 500 nm to 550 nm, from 1000 nm to 1150 nm, and from 1300 nm to 1400 nm. This is implemented by designing the components of the laser converging unit 400 so as to satisfy desired optical performance, such as coating the components of the laser converging unit 400 with a predetermined dielectric multilayer film. Note that, in the laser output unit 300, the $\lambda/2$ wave plate unit 330 includes a $\lambda/2$ wave plate, and the polarizing plate unit 340 includes a polarizing plate. The $\lambda/2$ wave plate and the polarizing plate are optical devices having high wavelength dependence. For that reason, the $\lambda/2$ wave plate unit 330 and the polarizing plate unit 340 are provided in the laser output unit 300 as different components for each wavelength band.

[Optical Path and Polarization Direction of Laser Light in Laser Processing Device]

In the laser processing device 200, as illustrated in FIG. 11, the polarization direction of the laser light L converged at the object to be processed 1 supported by the support table 230 is a direction parallel to the X-axis direction, and coincides with the processing direction (scanning direction of the laser light L). Here, in the reflective spatial light modulator 410, the laser light L is reflected as P-polarized light. This is because in a case where a liquid crystal is used for the light modulation layer of the reflective spatial light modulator 410, when the liquid crystal is oriented such that the liquid crystal molecules are inclined in a surface parallel to the plane including the optical axis of the laser light L entering and exiting the reflective spatial light modulator 410, phase modulation is applied to the laser light L in a state where the rotation of the plane of polarization is inhibited (for example, see Japanese Patent No. 3878758). On the other hand, in the dichroic mirror 403, the laser light L is reflected as S-polarized light. This is because, for example, when the laser light L is reflected as the S-polarized light rather than when the laser light L is reflected as the P-polarized light, the number of coatings is reduced of the dielectric multilayer film for making the dichroic mirror 403 adapt to the multiple wavelengths, and designing of the dichroic mirror 403 becomes easier.

Therefore, in the laser converging unit 400, the optical path from the mirror 402 via the reflective spatial light modulator 410 and the 4f lens unit 420 to the dichroic mirror 403 is set along the XY plane, and the optical path from the dichroic mirror 403 to the converging lens unit 430 is set along the Z-axis direction.

As illustrated in FIG. 9, in the laser output unit 300, the optical path of the laser light L is set along the X-axis direction or the Y-axis direction. Specifically, the optical path from the laser oscillator 310 to the mirror 303, and the optical path from the mirror 304 via the λ/2 wave plate unit 330, the polarizing plate unit 340, and the beam expander 350 to the mirror unit 360 are set along the X-axis direction, and the optical path from the mirror 303 via the shutter 320 to the mirror 304, and the optical path from the mirror 362 to the mirror 363 in the mirror unit 360 are set along the Y-axis direction.

Here, as illustrated in FIG. 11, the laser light L having traveled to the laser converging unit 400 from the laser output unit 300 along the Z-axis direction is reflected by the mirror 402 in a direction parallel to the XY plane, and enters the reflective spatial light modulator 410. At this time, in the plane parallel to the XY plane, an acute angle α is formed by the optical axis of the laser light L entering the reflective spatial light modulator 410 and the optical axis of the laser light L emitted from the reflective spatial light modulator 410. On the other hand, as described above, in the laser output unit 300, the optical path of the laser light L is set along the X-axis direction or the Y-axis direction.

Therefore, in the laser output unit 300, it is necessary to cause the λ/2 wave plate unit 330 and the polarizing plate unit 340 to function not only as the output adjusting unit configured to adjust the output of the laser light L but also as the polarization direction adjusting unit configured to adjust the polarization direction of the laser light L.

[Reflective Spatial Light Modulator]

Figure 14:
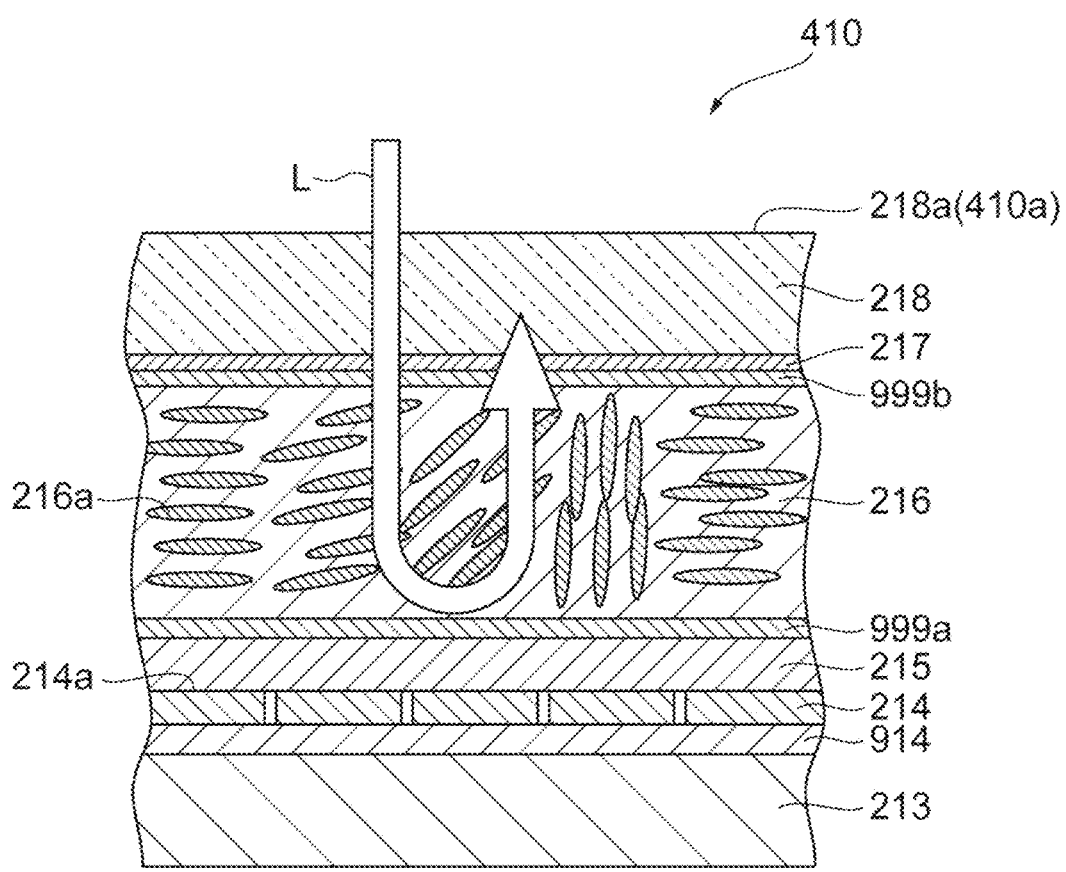
FIG. 14 is a partial sectional view of a reflective spatial light modulator in the laser processing device of FIG. 7.

As illustrated in FIG. 14, the reflective spatial light modulator 410 includes a silicon substrate 213, a drive circuit layer 914, a plurality of pixel electrodes 214, a reflecting film 215 such as a dielectric multilayer mirror, an alignment film 999a, a liquid crystal layer (display unit) 216, an alignment film 999b, a transparent conductive film 217, and a transparent substrate 218 such as a glass substrate, which are layered in this order.

The transparent substrate 218 includes a front surface 218a along the XY plane, and the front surface 218a constitutes the reflective surface 410a of the reflective spatial light modulator 410. The transparent substrate 218 is made of a light transmitting material such as glass, for example, and transmits the laser light L of a predetermined wavelength having entered from the front surface 218a of the reflective spatial light modulator 410 to the inside of the reflective spatial light modulator 410. The transparent conductive film 217 is formed on a back surface of the transparent substrate 218, and includes a conductive material (for example, ITO) which transmits therethrough the laser light L.

The plurality of pixel electrodes 214 is arranged in a matrix on the silicon substrate 213 along the transparent conductive film 217. Each pixel electrode 214 is made of a metal material such as aluminum, for example, while its front surface 214a is processed flat and smooth. The plurality of pixel electrodes 214 are driven by an active matrix circuit provided in the drive circuit layer 914.

The active matrix circuit is provided between the plurality of pixel electrodes 214 and the silicon substrate 213, and controls an applied voltage to each of the pixel electrodes 214 in accordance with a light image to be output from the reflective spatial light modulator 410. Such an active matrix circuit includes a first driver circuit configured to control the applied voltage for pixel rows arranged in the X-axis direction, and a second driver circuit configured to control the applied voltage for pixel rows arranged in the Y-axis direction, which are not illustrated, for example, and a predetermined voltage is applied to the pixel electrode 214 of a pixel specified by the driver circuits, by a controller 5000 (See FIG. 7).

The alignment films 999a, 999b are arranged on both end surfaces of the liquid crystal layer 216, respectively, so as to align a group of liquid crystal molecules in a fixed direction. The alignment films 999a, 999b are made of a polymer material such as polyimide, of which surfaces coming into contact with the liquid crystal layer 216 are subjected to rubbing, and the like.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when a voltage is applied to the pixel electrodes 214 by the active matrix circuit of the drive circuit layer 914, an electric field is formed between the transparent conductive film 217 and the pixel electrodes 214, and alignment direction of liquid crystal molecules 216a changes according to a magnitude of the electric field formed in the liquid crystal layer 216. When the laser light L enters the liquid crystal layer 216 through the transparent substrate 218 and the transparent conductive film 217, the laser light L is modulated by the liquid crystal molecules 216a while passing through the liquid crystal layer 216, and reflected by the reflecting film 215, and then modulated again by the liquid crystal layer 216, and emitted.

At this time, the voltage applied to each of the pixel electrodes 214 is controlled by the controller 500 (see FIG. 7), and, in accordance with the voltage, a refractive index changes in a portion sandwiched between the transparent conductive film 217 and each of the pixel electrodes 214 in the liquid crystal layer 216 (the refractive index changes of the liquid crystal layer 216 at a position corresponding to each pixel). Due to the change in the refractive index, the phase of the laser light L can be changed for each pixel of the liquid crystal layer 216 in accordance with the voltage applied. That is, phase modulation corresponding to the hologram pattern can be applied by the liquid crystal layer 216 for each pixel. In other words, a modulation pattern as the hologram pattern applying the modulation can be displayed on the liquid crystal layer 216 of the reflective spatial light modulator 410. The wavefront is adjusted of the laser light L that enters and is transmitted through the modulation pattern, and shifts occur in phases of components of individual rays constituting the laser light L in a predetermined direction orthogonal to their traveling direction. Therefore, the laser light L can be modulated (for example, intensity, amplitude, phase, and polarization of the laser light L can be modulated) by appropriately setting the modulation pattern to be displayed in the reflective spatial light modulator 410.

[4f Lens Unit]

Figure 15:
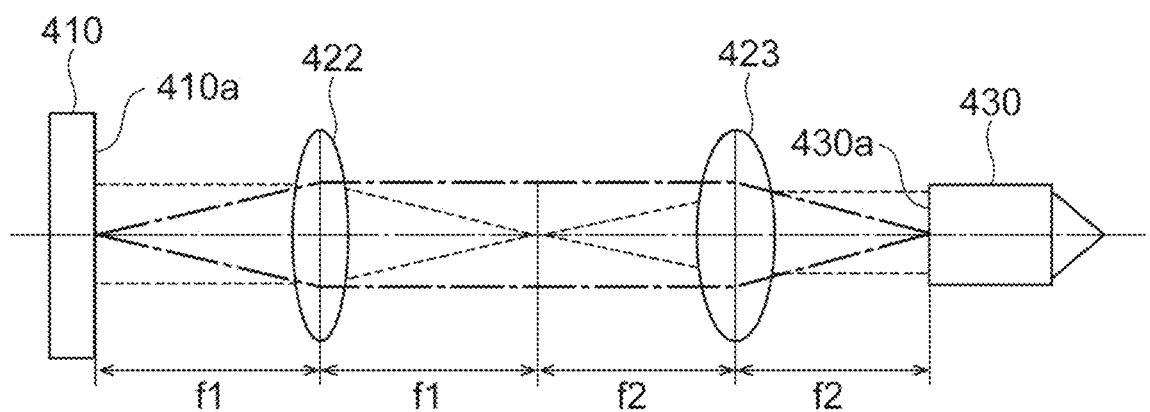
FIG. 15 is a diagram illustrating an optical arrangement relationship among a reflective spatial light modulator, a 4f lens unit, and a converging lens unit in the laser converging unit of FIG. 11.

As described above, the pair of lenses 422 and 423 of the 4f lens unit 420 constitutes the double telecentric optical system in which the reflective surface 410a of the reflective spatial light modulator 410 and the entrance pupil plane 430a of the converging lens unit 430 are in the imaging relationship. Specifically, as illustrated in FIG. 15, the distance of the optical path between the center of the lens 422 on the reflective spatial light modulator 410 side and the reflective surface 410a of the reflective spatial light modulator 410 is a first focal length f1 of the lens 422, the distance of the optical path between the center of the lens 423 on the converging lens unit 430 side and the entrance pupil plane 430a of the converging lens unit 430 is a second focal length f2 of the lens 423, and the distance of the optical path between the center of the lens 422 and the center of the lens 423 is a sum of the first focal length f1 and the second focal length f2 (that is, f1+f2). In the optical path from the reflective spatial light modulator 410 to the converging lens unit 430, the optical path between the pair of lenses 422 and 423 is a straight line.

In the laser processing device 200, from a viewpoint of increasing an effective diameter of the laser light L on the reflective surface 410a of the reflective spatial light modulator 410, a magnification M of the double telecentric optical system satisfies 0.5<M<1 (reduction system). As the effective diameter is increased of the laser light L on the reflective surface 410a of the reflective spatial light modulator 410, the laser light L is modulated with a high-precision phase pattern. From a viewpoint of inhibiting the optical path from becoming longer of the laser light L from the reflective spatial light modulator 410 to the converging lens unit 430, it is possible to set 0.6≤M≤0.95. Here, (the magnification M of the double telecentric optical system)=(the size of the image on the entrance pupil plane 430a of the converging tens unit 430)/(the size of the object on the reflective surface 410a of the reflective spatial light modulator 410). In the case of the laser processing device 200, the magnification M of the double telecentric optical system, the first focal length f1 of the lens 422, and the second focal length f2 of the lens 423 satisfy M=f2/f1.

From a viewpoint of reducing the effective diameter of the laser light L on the reflective surface 410a of the reflective spatial light modulator 410, the magnification M of the double telecentric optical system may satisfy 1<M<2 (enlargement system). As the effective diameter is reduced of the laser light L on the reflective surface 410a of the reflective spatial light modulator 410, the magnification can be reduced of the beam expander 350 (see FIG. 9), and in the plane parallel to the XY plane, the angle α (see FIG. 11) is reduced formed by the optical axis of the laser light L entering the spatial light modulator 410 and the optical axis of the laser light L emitted from the reflective spatial light modulator 410. From the viewpoint of inhibiting the optical path from becoming longer of the laser light L from the reflective spatial light modulator 410 to the converging lens unit 430, it is possible to set 1.05≤M≤1.7.

Next, a main part of the laser processing device 200 according to the embodiment will be described in detail.

Figure 16:
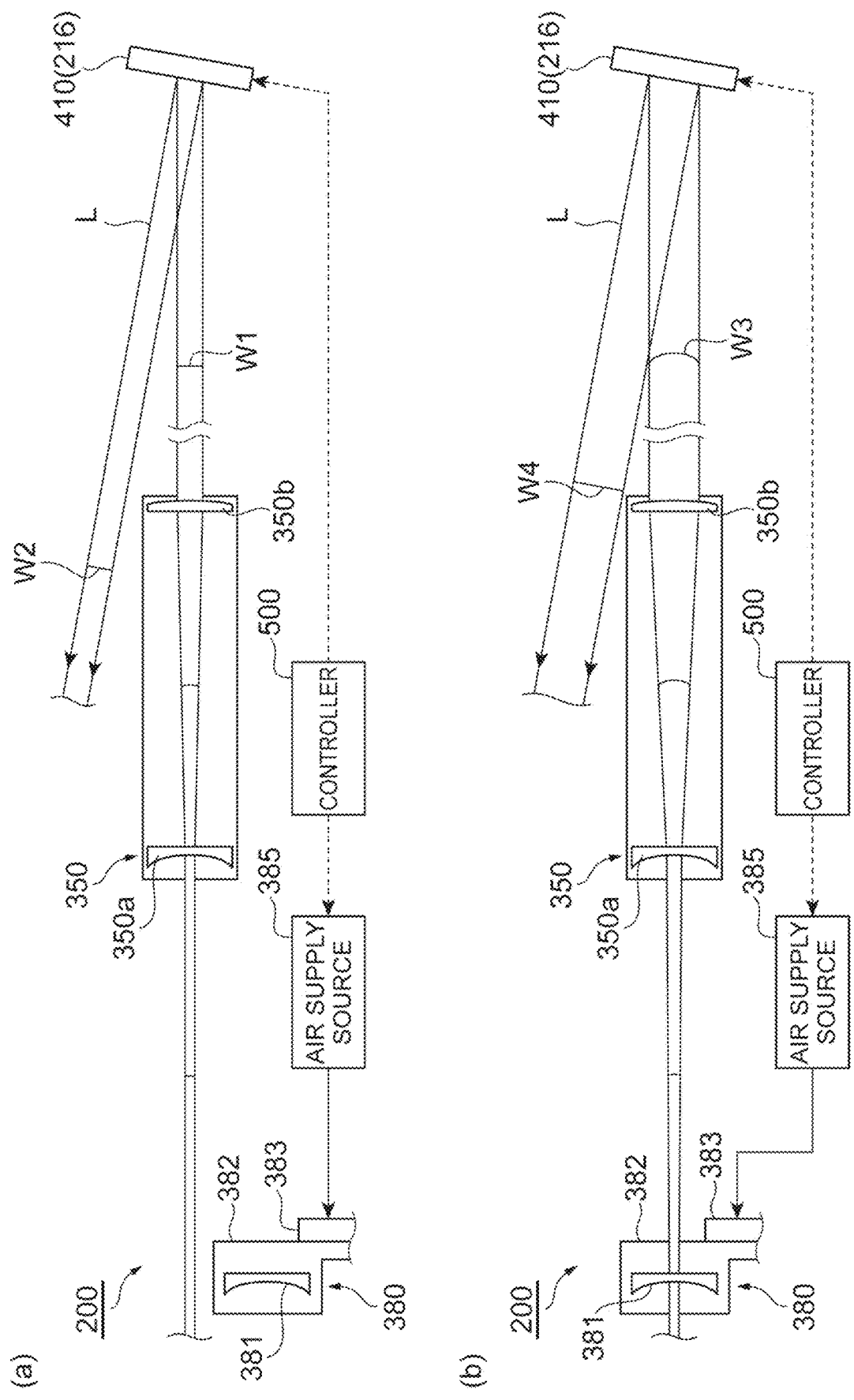
FIG. 16 is a schematic configuration diagram illustrating a main part of the laser processing device according to the embodiment.

FIG. 16 is a schematic configuration diagram illustrating the main part of the laser processing device 200 according to the embodiment. FIG. 16(a) illustrates a first state in which the insertion and removal lens 381 is separated from the optical path of the laser light L (hereinafter simply referred to as "first state"). FIG. 16(b) illustrates a second state in which the insertion and removal lens 381 is located on the optical path of the laser light L (hereinafter also simply referred to as "second state").

As illustrated in FIG. 16, the beam expander 350 is a fixed magnification type optical module configured to magnify the beam diameter of the laser light L by a constant magnification. The beam expander 350 includes a first lens 350a and a second lens 350b. The first lens 350a and the second lens 350b are arranged in this order in the traveling direction of the laser light L, to be separated from each other along the optical path of the laser light L. The first lens 350a and the second lens 350b are secured so as not to move along the optical path of the laser light L, and the distance between the first lens 350a and the second lens 350b is kept constant.

The first lens 350a is an optical device configured to diverge the laser light L entering, to expand the beam diameter of the laser light L. As the first lens 350a, for example, a plano-concave lens is used. The second lens 350b is an optical device configured to collimate the laser light L having passed through the first lens 350a. As the second lens 350b, for example, a plano-convex lens is used.

Figure 17:
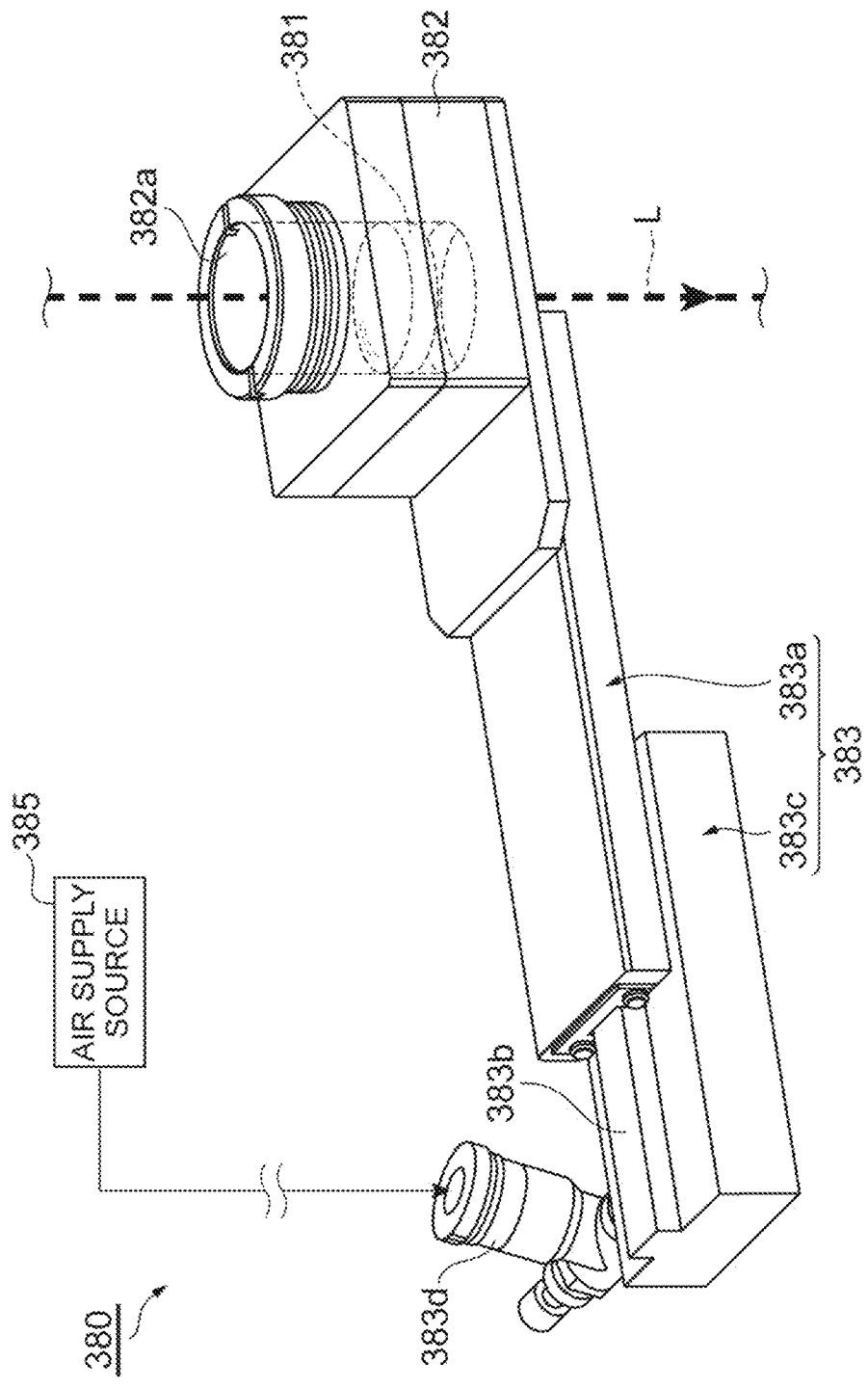
FIG. 17 is a perspective view illustrating a configuration of a lens insertion and removal mechanism in a second state in which an insertion and removal lens is located on an optical path of laser light.
Figure 18:
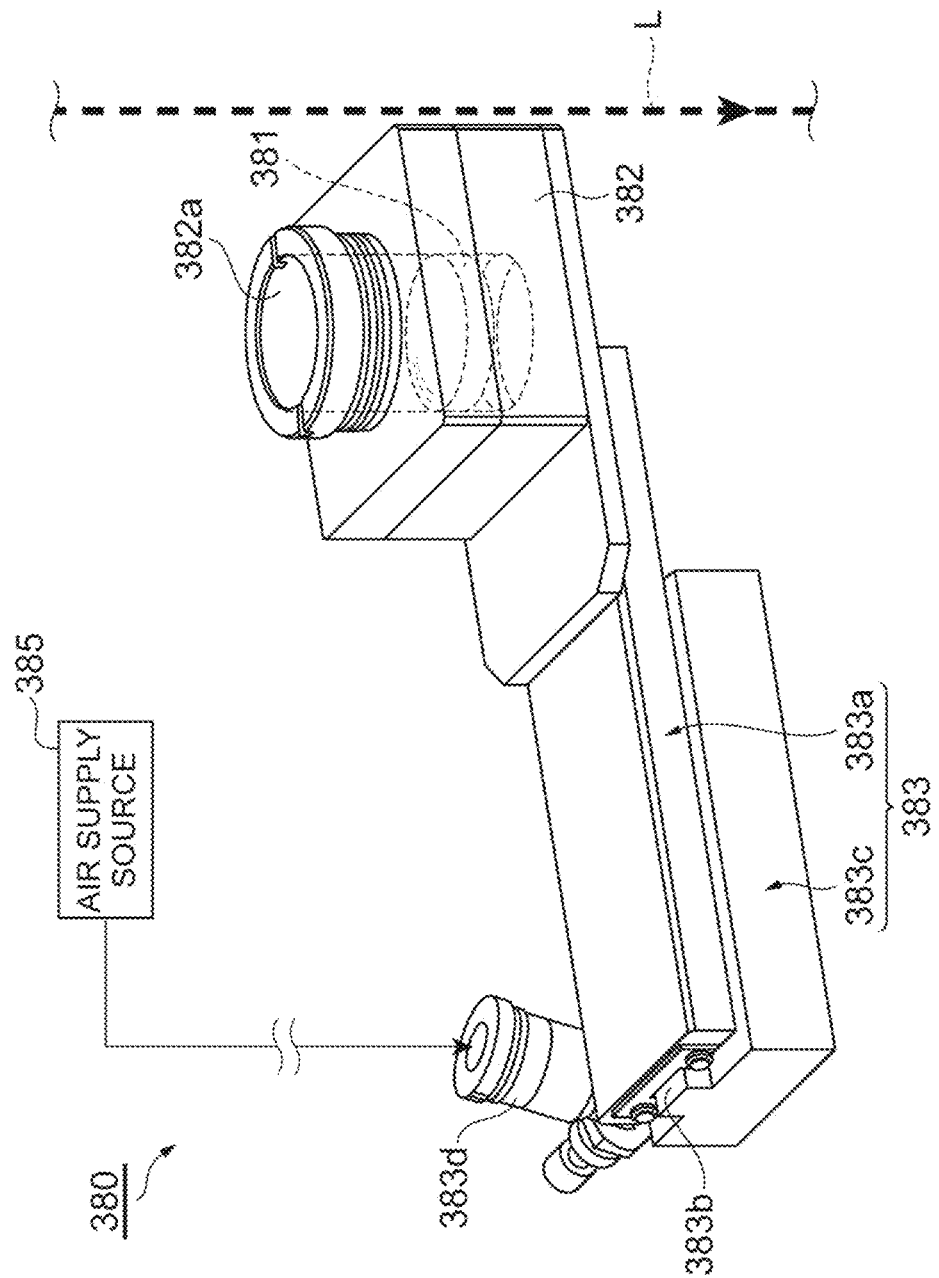
FIG. 18 is a perspective view of a configuration of the lens insertion and removal mechanism in a first state in which the insertion and removal lens is separated from the optical path of the laser light.

FIG. 17 is a perspective view illustrating a configuration of a lens insertion and removal mechanism 380 in the second state in which the insertion and removal lens 381 is located on the optical path of the laser light L. FIG. 18 is a perspective view illustrating a configuration of the lens insertion and removal mechanism 380 in the first state in which the insertion and removal lens 381 is separated from the optical path of the laser light L. As illustrated in FIGS. 16 to 18, the lens insertion and removal mechanism 380 includes the insertion and removal lens 381, a lens holder 382, and a linear motion stage 383. The lens insertion and removal mechanism 380 is enabled to slide the insertion and removal lens 381 in an orthogonal direction (crossing direction) of the optical path of the laser light L such that the position of the insertion and removal lens 381 is switched between the first state (see FIGS. 16(a) and 18) and the second state (see FIGS. 16(b) and 17).

The insertion and removal lens 381 is an optical device configured to diverge the laser light L as parallel light entering, to expand the beam diameter of the laser light L. As the insertion and removal lens 381, for example, a plano-concave lens is used. The insertion and removal lens 381 is a lens having low power. For example, the insertion and removal lens 381 is a lens having lower power than the first lens 350a of the beam expander 350.

In the second state in which the insertion and removal lens 381 is located on the optical path of the laser light L, the insertion and removal lens 381 is arranged to be separated from the beam expander 350 by a predetermined length along the optical path of the laser light L. For example, the insertion and removal lens 381 in the second state is located such that the distance to the beam expander 350 is longer than the distance to the polarizing plate unit 340 in a direction along the optical path of the laser light L (at a position closer to the polarizing plate unit 340 between the polarizing plate unit 340 and the beam expander 350).

The lens holder 382 is a member configured to hold the insertion and removal lens 381. Specifically, the lens holder 382 includes a through hole 382a extending along the optical path of the laser light L. The insertion and removal lens 381 is arranged and secured in the through hole 382a.

The linear motion stage 383 includes a slider 383a as a movable portion to which the lens holder 382 is secured, and a base 383c as a secured portion including a guide rail 383b configured to guide the slider 383a. The linear motion stage 383 is an air driven stage driven by air. Specifically, the linear motion stage 383 uses air supplied via an air vent 383d from an air supply source 385 such as a compressor, to slide the slider 383a along the orthogonal direction of the optical path of the laser light L with respect to the base 383c. Thus, the position of the insertion and removal lens 381 is switched from the first state in which the insertion and removal lens 381 is separated from the optical path of the laser light L to the second state in which the insertion and removal lens 381 is located on the optical path of the laser light L, or switched from the second state to the first state.

The controller 500 controls operation of the air supply source 385 to control the air to be supplied to the lens insertion and removal mechanism 380. Thus, the controller 500 switches the position of the insertion and removal lens 381 between the first state and the second state.

The controller 500 controls the phase pattern to be displayed on the liquid crystal layer 216 of the reflective spatial light modulator 410. The phase pattern is the modulation pattern described above, and modulates the laser light L. As illustrated in FIG. 16(*b*), in a state in which the insertion and removal lens 381 is inserted in the optical path of the laser light L by the lens insertion and removal mechanism 380 (that is, in the second state), the controller 500 of the present embodiment displays, on the liquid crystal layer 216, a wavefront aberration correction pattern that is a phase pattern configured to correct a wavefront aberration caused by insertion of the insertion and removal lens 381 (hereinafter also simply referred to as "wavefront aberration correction pattern"). On the other hand, as illustrated in FIG. 16(*a*), in a state in which the insertion and removal lens 381 is removed from the optical path of the laser light L by the lens insertion and removal mechanism 380 (that is, in the first state), the controller 500 does not display the wavefront aberration correction pattern, on the liquid crystal layer 216.

In a case where the wavefront aberration correction pattern is displayed, when another phase pattern is not displayed on the liquid crystal layer 216, the wavefront aberration correction pattern is displayed alone on the liquid crystal layer 216 as it is. On the other hand, in a case where the wavefront aberration correction pattern is displayed, when another phase pattern is displayed together on the liquid crystal layer 216, a phase pattern formed by synthesizing the wavefront aberration correction pattern with the other phase pattern is displayed on the liquid crystal layer 216. The wavefront aberration caused by insertion of the insertion and removal lens 381 can be obtained by performing a measurement test, a simulation, or the like in advance. The generation and synthesis of the phase pattern are not particularly limited, and can be performed by using various known methods.

Next, a laser processing method (laser light irradiation method) by the laser processing device 200 will be described.

For example, in a case where laser processing is performed on the object to be processed 1 having a thickness of greater than or equal to a predetermined thickness, driving of the lens insertion and removal mechanism 380 is controlled by the controller 500, and as illustrated in FIGS. 16(*a*) and 18, the state (first state) is set in which the insertion and removal lens 381 is removed from the optical path of the laser light L. In this state, the wavefront aberration correction pattern is not displayed on the liquid crystal layer 216. Then, the laser light L is generated from the laser oscillator 310 by the controller 500, and the laser light L is emitted to the object to be processed 1. In conjunction with this, the first moving mechanism 220 is driven to relatively move the laser light L along the line to cut 5. Thus, the modified region 7 is formed along the line to cut 5, in the object to be processed 1.

As illustrated in FIG. 16(*a*), in removal of the insertion and removal lens 381 (the first state), when the beam diameter of the laser light L generated from the laser oscillator 310 is φ 2 mm, for example, the beam diameter is enlarged to be φ 6 mm by the beam expander 350. In addition, with respect to a wavefront W1 of the laser light L whose beam diameter is enlarged by the beam expander 350, no wavefront aberration occurs, or the wavefront aberration is less than or equal to a certain level. Further, also with respect to a wavefront W2 of the laser light L emitted from the reflective spatial light modulator 410, no wavefront aberration occurs, or the wavefront aberration is less than or equal to the certain level.

On the other hand, for example, in a case where laser processing is performed on the object to be processed 1 having a thickness of thinner than the predetermined thickness, driving of the lens insertion and removal mechanism 380 is controlled by the controller 500, and as illustrated in FIGS. 16(*b*) and 17, the state is set (second state) in which the insertion and removal lens 381 is inserted in the optical path of the laser light L. In this state, the wavefront aberration correction pattern is displayed on the liquid crystal layer 216 by the controller 500. Then, the laser light L is generated from the laser oscillator 310 by the controller 500, and the laser light L is emitted to the object to be processed 1. In conjunction with this, the first moving mechanism 220 is driven to relatively move the laser light L along the line to cut 5. Thus, the modified region 7 is formed along the line to cut 5, in the object to be processed 1.

As illustrated in FIG. 16(*b*), in insertion of the insertion and removal lens 381 (the second state), when the beam diameter of the laser light L generated from the laser oscillator 310 is φ 2 mm, for example, the beam diameter is enlarged by the insertion and removal lens 381 and enlarged by the beam expander 350, and as a result, the beam diameter of the laser light L having passed through the beam expander 350 becomes φ12 mm. In addition, with respect to a wavefront W3 of the laser light L whose beam diameter is enlarged by the beam expander 350, wavefront aberration occurs due to enlargement of the beam diameter of the laser light L by the insertion and removal lens 381. On the other hand, with respect to a wavefront W4 of the laser light L emitted from the reflective spatial light modulator 410, the wavefront aberration is corrected (canceled) by the reflective spatial light modulator 410, and as a result, no wavefront aberration occurs, or the wavefront aberration is less than or equal to the certain level.

The beam diameter of the laser light L may be varied depending on the application, and in such a case, it is necessary to move or interlock a portion or a plurality of portions of the optical system along the optical path of the laser light L. Therefore, in addition to an increase in the number of constituent lenses in consideration of the wavefront aberration of the laser light L caused by the change in the optical arrangement, a mechanism configured to precisely control the lens position is required, and a constraint arises that the design becomes difficult.

In this respect, with the laser processing device 200, the insertion and removal lens 381 can be inserted in the optical path of the laser light L, and the insertion and removal lens 381 can be removed from the optical path. Thus, the beam diameter of the laser light L is varied without requiring a complicated mechanism configured to interlock the plurality of portions of the optical system along the optical path of the laser light L, for example. Then, the wavefront aberration caused by the variation of the beam diameter is satisfactorily corrected by the phase pattern (phase distribution that cancels the wavefront aberration) displayed on the liquid crystal layer 216 of the reflective spatial light modulator 410. Thus, it is possible to reduce necessity and restriction of a mechanism that does not cause the wavefront aberration. Therefore, it is possible to simply vary the beam diameter enlarged or reduced by the beam expander 350.

As a result, in the laser processing device 200, the configuration of the optical system can be simplified, and the design constraint can be greatly relaxed. It is possible to increase the variable range of the beam diameter of the laser light L. Since the wavefront aberration caused by the variation of the beam diameter is corrected by using the reflective spatial light modulator 410, it is possible to deal with a case where aberration other than defocus occurs when the beam diameter is varied.

In the laser processing device 200, the lens insertion and removal mechanism 380 is enabled to slide the insertion and removal lens 381 in a direction orthogonal to the optical path of the laser light L such that the position of the insertion and removal lens 381 is switched between the first state in which the insertion and removal lens 381 is separated from the optical path and the second state in which the insertion and removal lens 381 is located on the optical path. In this case, by sliding the insertion and removal lens 381 by the lens insertion and removal mechanism 380, it is possible to implement insertion and removal of the insertion and removal lens 381 with respect to the optical path of the laser light L.

In the laser processing device 200, in the state (second state) in which the insertion and removal lens 381 is inserted in the optical path of the laser light L by the lens insertion and removal mechanism 380, the controller 500 displays, on the liquid crystal layer 216, the wavefront aberration correction pattern configured to correct the wavefront aberration caused by insertion of the insertion and removal lens 381. Thus, the wavefront aberration caused by insertion of the insertion and removal lens 381 is corrected by the wavefront aberration correction pattern.

The laser processing device 200 forms the modified region 7 within the object to be processed 1 by setting the converging point P within the object to be processed 1 and emitting the laser light L. Thus, laser processing within the object to be processed 1 can be performed.

Figure 19:
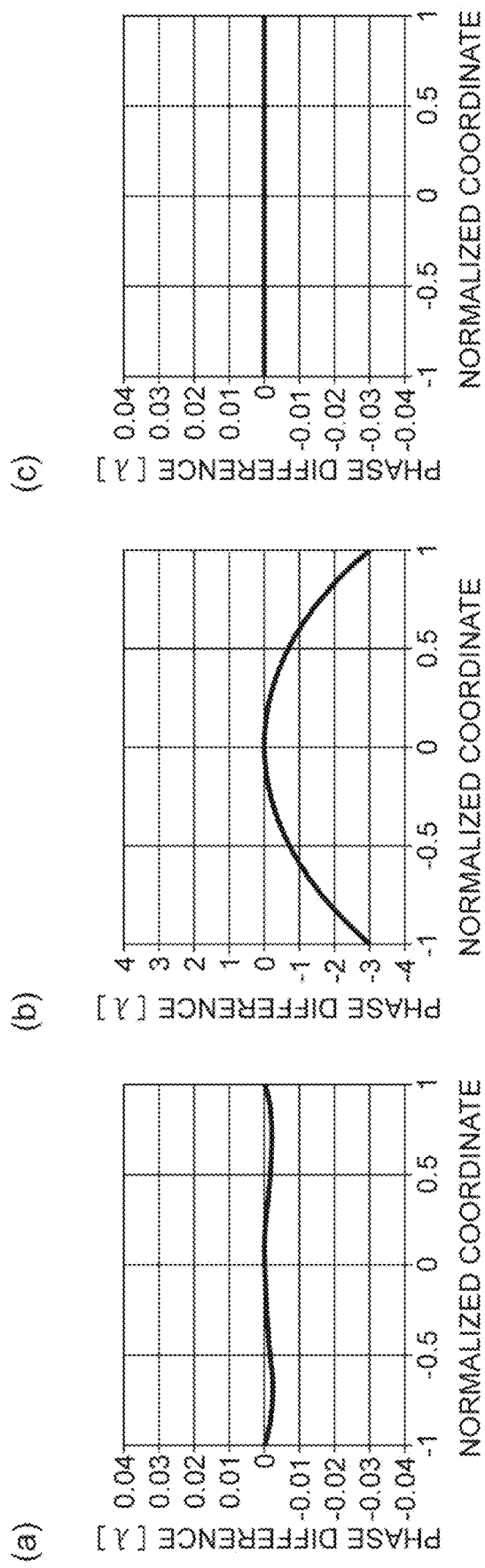
FIG. 19 is a diagram illustrating a simulation result for describing wavefront aberration of laser light whose beam diameter is enlarged.

FIG. 19 is a diagram illustrating a simulation result for describing the wavefront aberration of the laser light L whose beam diameter is enlarged by the beam expander 350. FIG. 19(a) illustrates a result of the state (first state) in which the insertion and removal lens 381 is removed from the optical path of the laser light L in the laser processing device 200. FIGS. 19(b) and 19(c) each illustrate a result of the state (second state) in which the insertion and removal lens 381 is inserted in the optical path of the laser light L in the laser processing device 200. In addition, FIG. 19(b) illustrates a result in a case where the wavefront aberration caused by insertion of the insertion and removal lens 381 is not corrected by the reflective spatial light modulator 410, and FIG. 19(c) illustrates a result in a case where the wavefront aberration caused by insertion of the insertion and removal lens 381 is corrected by the reflective spatial light modulator 410. In each figure, the horizontal axis represents the normalized coordinate with reference to the center in the wavefront of the laser light L immediately after emission from the reflective spatial light modulator 410, and the vertical axis represents the phase difference of the wavefront of the laser light L.

As illustrated in FIG. 19(a), in removal of the insertion and removal lens 381 (the first state), the phase difference of the laser light L is substantially zero, and substantially no wavefront aberration of the laser light L has occurred. On the other hand, as illustrated in FIG. 19(b), in insertion of the insertion and removal lens 381 (the second state), in a case where the wavefront aberration of the laser light L is not corrected by the reflective spatial light modulator 410, the phase difference of the laser light L changes in a quadratic curve shape (so as to be larger towards the negative side with the increase of separation from zero), and the wavefront aberration of the laser light L has occurred. In this respect, in the laser processing device 200 of the present embodiment, as illustrated in FIG. 19(c), in insertion of the insertion and removal lens 381, by correcting the wavefront aberration of the laser light L by the reflective spatial light modulator 410, the phase difference of the laser light L can be made zero, and the wavefront aberration of the laser light L can be suppressed.

In the laser light irradiation method of emitting the laser light L to the object to be processed 1 by using the laser processing device 200, as described above, the insertion and removal lens 381 configured to vary the beam diameter of the laser light L is inserted in the optical path of the laser light L between the laser oscillator 310 and the reflective spatial light modulator 410, or removed from the optical path (insertion and removal step). The phase pattern configured to correct the wavefront aberration caused by insertion or removal of the insertion and removal lens 381 is displayed on the liquid crystal layer 216 (display step). In a state in which the phase pattern is displayed on the liquid crystal layer 216, the laser light L is generated from the laser oscillator 310 and emitted to the object to be processed 1 (irradiation step).

In the laser light irradiation method, the insertion and removal lens 381 is inserted in the optical path of the laser light L, or the lens is removed from the optical path, and thus, the beam diameter of the laser light L is varied without requiring the complicated mechanism configured to interlock the plurality of positions of the optical system along the optical path of the laser light L, for example. Then, the wavefront aberration caused by the variation of the beam diameter is corrected by the phase pattern displayed on the liquid crystal layer 216 of the reflective spatial light modulator 410. Thus, it is possible to reduce necessity and restriction of a mechanism that does not cause the wavefront aberration. Therefore, it is possible to simply vary the beam diameter enlarged or reduced by the beam expander 350.

In the above, the embodiment has been described; however, the present invention is not limited to the above-described embodiment, and may be modified within the range not changing the gist described in each claim or applied to other things.

The above-described embodiment is not limited to one configured to form in the modified region 7 within the object to be processed 1, and may be one configured to perform another laser processing such as ablation. The above-described embodiment is not limited to a laser processing device used for laser processing of converging the laser light L within the object to be processed 1, and may be a laser processing device used for laser processing of converging the laser light L at the front surface 1a, 3 or the back surface 1b of the object to be processed 1. The device to which the present invention is applied is not limited to the laser processing device, and the present invention can be applied to various laser light irradiation devices as long as the devices emit the laser light L to the object. In the above-described embodiment, the line to cut 5 is set as an irradiation schedule line; however, the irradiation schedule line is not limited to the line to cut 5, and may be any line as long as it is a line along which the emitted laser light L is moved.

In the above-described embodiment, the relay magnification of each of the lenses 422, 423, and 463 may be an arbitrary magnification. The above-described embodiment includes the reflective spatial light modulator 410; however, the spatial light modulator is not limited to a reflective spatial light modulator, and a transmissive spatial light modulator may be included. In the above-described embodiment, the distance measuring sensors 450 may be arranged only on one side of the converging lens unit 430 in the X-axis direction.

Figure 20:
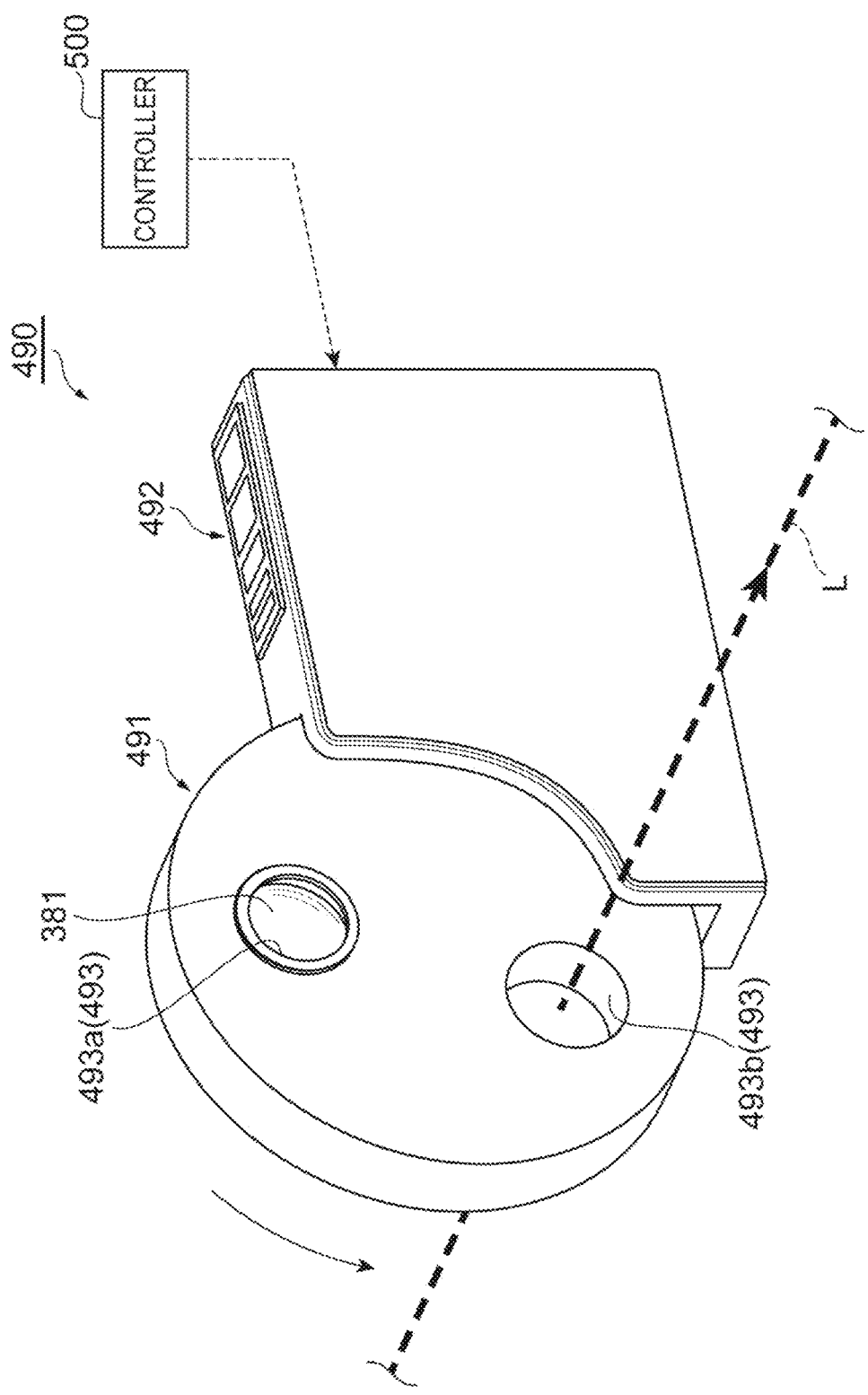
FIG. 20 is a perspective view illustrating a configuration of a lens insertion and removal mechanism according to a modification.

FIG. 20 is a perspective view illustrating a configuration of a lens insertion and removal mechanism according to a modification. The above-described embodiment includes the lens insertion and removal mechanism 380 enabled to slide the insertion and removal lens 381 such that the position of the insertion and removal lens 381 is switched between the first state and the second state; however, the present invention is not limited thereto. The above-described embodiment may include various lens insertion and removal mechanisms as long as they are enabled to insert the insertion and removal lens 381 in the optical path of the laser light L, or remove the lens from the optical path, and for example, may include a lens insertion and removal mechanism 490 as illustrated in FIG. 20.

The lens insertion and removal mechanism 490 illustrated in FIG. 20 includes a lens holder 491 configured to hold the insertion and removal lens 381, and a holder drive unit 492 configured to rotate the lens holder 491 around an axis along the optical path of the laser light L. The lens holder 491 has a disk shape whose thickness direction is the direction along the optical path of the laser light L. Through holes 493 are formed at a pair of positions symmetrical with respect to the center in the lens holder 491. In one through hole 493*a* of the through holes 493, the insertion and removal lens 381 is arranged and held. In another through hole 493*b* of the through holes 493, the insertion and removal lens 381 is not arranged, and the through hole 493*b* is a hollow portion.

The holder drive unit 492 rotationally drives the lens holder 491 by using electric power as power. Specifically, the holder drive unit 492 supports the lens holder 491 so as to be rotatable in the circumferential direction. The holder drive unit 492 is controlled by the controller 500, and rotationally drives the lens holder 491 so as to set a state in which the optical path of the laser light L passes through the through hole 493*b* that is the hollow portion (that is, the first state in which the insertion and removal lens 381 is separated from the optical path of the laser light L). In addition, the holder drive unit 492 is controlled by the controller 500, and rotationally drives the lens holder 491 so as to set a state in which the optical path of the laser light L passes through the through hole 493*a* holding the insertion and removal lens 381 (that is, the second state in which the insertion and removal lens 381 is located on the optical path of the laser light L).

Such a lens insertion and removal mechanism 490 is enabled to rotate the lens holder 491 around the axis along the optical path of the laser light L such that the position of the insertion and removal lens 381 is switched between the first state and the second state. Thus, by rotating the lens holder 491 by the lens insertion and removal mechanism 490, it is possible to implement insertion and removal of the insertion and removal lens 381 with respect to the optical path of the laser light L.

The lens insertion and removal mechanism 380 of the above-described embodiment uses air to switch the position of the insertion and removal lens 381; however, the lens insertion and removal mechanism 380 may use other power such as electric power to switch the position, or may manually switch the position. The lens insertion and removal mechanism 490 of the above-described embodiment uses electric power to switch the position of the insertion and removal lens 381; however, the lens insertion and removal mechanism 490 may use other power such as air to switch the position, or may manually switch the position. Further, for example, without depending on the lens insertion and removal mechanisms 380 and 480, a person may perform insertion and removal of the insertion and removal lens 381 with respect to the optical path of the laser light L.

In the above-described embodiment, the insertion and removal lens 381 can be inserted between the polarizing plate unit 340 and the beam expander 350 on the optical path of the laser light L; however, it is sufficient that the insertion and removal lens 381 can be inserted between the beam expander 350 and the reflective spatial light modulator 410, or can be inserted between the first lens 350*a* and the second lens 350*b* of the beam expander 350. In short, it is sufficient that the insertion and removal lens 381 can be inserted in the optical path of the laser light L between the laser oscillator 310 and the reflective spatial light modulator 410.

The beam expander 350 of the above-described embodiment enlarges the beam diameter of the laser light L; however, the beam expander 350 may reduce the beam diameter. In short, it is sufficient that the above-described embodiment includes a beam diameter conversion mechanism configured to enlarge or reduce the beam diameter of the laser light L. The insertion and removal lens 381 of the above-described embodiment enlarges the beam diameter of the laser light L; however, the insertion and removal lens 381 may reduce the beam diameter. The laser light L corrected by the reflective spatial light modulator 410 is not necessarily a plane wave, and may be an arbitrary wavefront shape. In the above-described embodiment, the insertion and removal lens 381 is not limited to a spherical lens, and may be various lenses. For example, the insertion and removal lens 381 may be cylindrical, or an aspherical lens.

In the above-described embodiment, the optical system is configured such that the wavefront aberration of the laser light L does not occur in the state (the first state) in which the insertion and removal lens 381 is removed from the optical path of the laser light L, and the phase pattern is displayed on the liquid crystal layer 216 in the state (second state) in which the insertion and removal lens 381 is inserted in the optical path of the laser light L, whereby the wavefront aberration caused by insertion of the insertion and removal lens 381 is corrected by the phase pattern. However, conversely, the optical system is configured such that the wavefront aberration of the laser light L does not occur in the second state, and the phase pattern is displayed on the liquid crystal layer 216 in the first state, whereby the wavefront aberration caused by removal of the insertion and removal lens 381 may be corrected by the phase pattern. Furthermore, the phase pattern is displayed on the liquid crystal layer 216 in the first state, whereby the wavefront aberration caused by removal of the insertion and removal lens 381 may be corrected by the wavefront aberration correction pattern, and the phase pattern is displayed on the liquid crystal layer 216 also in the second state, whereby the wavefront aberration caused by insertion of the insertion and removal lens 381 may be corrected by the phase pattern. The wavefront aberration caused by removal of the insertion and removal lens 381 can be obtained by performing a measurement test, a simulation, or the like in advance.

REFERENCE SIGNS LIST

1 object to be processed (object)
5, 5*a*, 5*b* line to cut (irradiation schedule line)

7 modified region
100, 200 laser processing device (laser light irradiation device)
216 liquid crystal layer (display unit)
310 laser oscillator (laser light source)
350 beam expander (beam diameter conversion mechanism)
380, 490 lens insertion and removal mechanism
381 insertion and removal lens (lens)
410 reflective spatial light modulator (spatial light modulator)
491 lens holder
500 controller
L laser light

The invention claimed is:

1. A laser light irradiation device configured to emit laser light to an object, the laser light irradiation device comprising:
a laser light source configured to generate the laser light;
a spatial light modulator including a display unit configured to display one or more phase patterns, the spatial light modulator configured to modulate the laser light generated by the laser light source in accordance with the one or more phase patterns displayed on the display unit;
a beam diameter conversion mechanism arranged on an optical path of the laser light between the laser light source and the spatial light modulator, the beam diameter conversion mechanism configured to enlarge or reduce the beam diameter of the laser light;
a lens insertion and removal mechanism including a lens configured to vary the beam diameter of the laser light, a lens holder configured to hold the lens, and a linear motion stage including a movable portion to which the lens holder is secured, the lens insertion and removal mechanism being enabled to, when the laser light is emitted, (i) insert the lens in the optical path of the laser light between the laser light source and the spatial light modulator, and (ii) remove the lens from the optical path; and
a controller configured to control at least the one or more phase patterns to be displayed on the display unit,
wherein
in a first state in which the lens is removed from the optical path of the laser light by the lens insertion and removal mechanism, the controller is configured to cause the display unit to display a first phase pattern of the one or more phase patterns, the first phase pattern configured to correct a first wavefront aberration caused by the removal of the lens, and
in a second state in which the lens is inserted in the optical path of the laser light by the lens insertion and removal mechanism, the controller is configured to cause the display unit to display a second phase pattern of the one or more phase patterns, the second phase pattern configured to correct a second wavefront aberration caused by the insertion of the lens.

2. The laser light irradiation device according to claim 1, wherein the movable portion of the linear motion stage is enabled to slide the lens in a direction orthogonal to the optical path.

3. The laser light irradiation device according to claim 2, wherein a modified region is formed within the object by setting a converging point within the object and emitting the laser light.

4. The laser light irradiation device according to claim 1, wherein a modified region is formed within the object by setting a converging point within the object and emitting the laser light.

5. A laser light irradiation method of emitting a laser light to an object by using a laser light irradiation device,
the laser light irradiation device including:
a laser light source configured to generate the laser light;
a spatial light modulator including a display unit configured to display one or more phase patterns, the spatial light modulator modulating the laser light generated by the laser light source in accordance with the one or more phase patterns displayed on the display unit; and
a beam diameter conversion mechanism arranged on an optical path of the laser light between the laser light source and the spatial light modulator, the beam diameter conversion mechanism enlarging or reducing the beam diameter of the laser light,
the laser light irradiation method comprising:
an insertion and removal step of, when the laser light is emitted, (i) inserting a lens configured to vary the beam diameter of the laser light in the optical path of the laser light between the laser light source and the spatial light modulator or (ii) removing the lens from the optical path, wherein the lens is inserted in or removed from the optical path by sliding the lens in a direction orthogonal to the optical path using a linear motion stage;
a display step of displaying, on the display unit, the one or more phase patterns; and
an irradiation step of generating the laser light from the laser light source to emit the laser light to the object, in a state in which the one or more phase patterns are displayed on the display unit by the display step,
wherein
in a first state in which the lens is removed from the optical path of the laser light during the insertion and removal step, the display step includes displaying, on the display unit, a first phase pattern of the one or more phase patterns, the first phase pattern configured to correct a first wavefront aberration caused by the removal of the lens, and
in a second state in which the lens is inserted in the optical path of the laser light during the insertion and removal step, the display step includes displaying, on the display unit, a second phase pattern of the one or more phase patterns, the second phase pattern configured to correct a second wavefront aberration caused by the insertion of the lens.

* * * * *